(12) United States Patent
Wang et al.

(10) Patent No.: US 11,973,176 B2
(45) Date of Patent: Apr. 30, 2024

(54) FEEDING DEVICE

(71) Applicant: CONTEMPORARY AMPEREX TECHNOLOGY CO., LIMITED, Ningde (CN)

(72) Inventors: Guangyao Wang, Ningde (CN); Xiang Fan, Ningde (CN); Gang Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/202,207

(22) Filed: May 25, 2023

(65) Prior Publication Data

US 2024/0079628 A1     Mar. 7, 2024

Related U.S. Application Data

(63) Continuation of application No. PCT/CN2022/116867, filed on Sep. 2, 2022.

(51) Int. Cl.
*H01M 10/04* (2006.01)

(52) U.S. Cl.
CPC .... *H01M 10/0404* (2013.01); *H01M 10/0481* (2013.01); *H01M 10/049* (2013.01)

(58) Field of Classification Search
CPC ........... H01M 10/0481; H01M 10/049; H01M 10/0404
See application file for complete search history.

(56) References Cited

U.S. PATENT DOCUMENTS

| 2015/0013720 A1* | 1/2015 | Yasooka | ........... H01M 10/0481 134/6 |
| 2018/0083306 A1* | 3/2018 | Melack | ............. H01M 10/0404 |

FOREIGN PATENT DOCUMENTS

| CN | 106881496 A | 6/2017 |
| CN | 108808126 A | 11/2018 |
| CN | 112792945 A | 5/2021 |
| CN | 213633746 U | 7/2021 |
| CN | 113275855 A | 8/2021 |
| DE | 102011081106 A1 | 2/2013 |

OTHER PUBLICATIONS

International Search Report and Written Opinion dated Jun. 1, 2023, in corresponding PCT/CN2022/116867, 7 pages.

* cited by examiner

*Primary Examiner* — Lingwen R Zeng
(74) *Attorney, Agent, or Firm* — XSENSUS LLP

(57) ABSTRACT

Embodiments of the present application provide a feeding device for loading a material into a container, which relates to the technical field of product assembly. The feeding device is configured to load a material into a container having an opening. The feeding device includes a pressing unit. The pressing unit includes a pressing member having a pressing plane, and a driving member configured to drive the pressing member to move cyclically along a closed track. The closed track includes a first planar track segment, and when the pressing member moves along the first planar track segment, the pressing plane forms surface contact with the material and keeps extending in a material loading direction, the material loading direction being a movement direction of the material relative to the container. The feeding device can reduce damage to the material during a feeding process.

18 Claims, 9 Drawing Sheets

FEEDING DEVICE

CROSS-REFERENCE TO RELATED APPLICATION

The present application is a continuation of PCT Patent Application No. PCT/CN2022/116867, entitled "FEEDING DEVICE" filed on Sep. 2, 2022, which is incorporated herein by reference in its entirety.

TECHNICAL FIELD

The present application relates to the technical field of product assembly, and in particular to a feeding device for loading a material into a container.

BACKGROUND ART

Energy conservation and emission reduction are the key to the sustainable development of the automobile industry. In this case, electric vehicles have become an important part of the sustainable development of the automobile industry because of their advantages of energy saving and environmental friendliness. For the electric vehicles, the battery technology is an important factor related to their development.

During a battery cell assembly process, it is usually necessary to use a feeding device to load an electrode assembly into a case. In the prior art, the feeding device is likely to damage the electrode assembly, resulting in low yield and production efficiency of battery cells. Therefore, how to optimize the structure of the feeding device and reduce the damage of the electrode assembly during the process of being loaded into the case is a technical problem to be solved urgently in the battery technology.

SUMMARY OF THE INVENTION

An objective of the present application is to provide a feeding device which can reduce damage to a material during a feeding process.

The present application is achieved by the following technical solutions.

In a first aspect, the present application provides a feeding device configured to load a material into a container having an opening, the feeding device including a pressing unit, the pressing unit including: a pressing member having a pressing plane; and a driving member configured to drive the pressing member to move cyclically along a closed track, wherein the closed track includes a first planar track segment, and when the pressing member moves along the first planar track segment, the pressing plane forms surface contact with the material and keeps extending in a material loading direction, the material loading direction being a movement direction of the material relative to the container.

According to the feeding device of the embodiments of the present application, when the pressing member moves along the first planar track segment, the contact between the pressing plane and the material (such as an electrode assembly) is a surface contact and the pressing plane keeps extending in the material loading direction, so that there is a large contact area between the pressing member and the material, and an action force applied by the pressing member to the material is dispersed, which can reduce the risk of damage to the material by the pressing member, thereby improving the yield and production efficiency of products (such as battery cells).

According to some embodiments of the present application, the pressing member includes a pressing member body and a buffer layer, the buffer layer covers at least part of a surface of the pressing member body, and the pressing plane is provided on the buffer layer.

In the above solution, the buffer layer is provided to buffer the pressing on the material by the pressing plane, so as to reduce the risk of damage to the material by the pressing plane.

According to some embodiments of the present application, a movement direction of the pressing member along the first planar track segment is the same as the material loading direction.

In the above solution, the movement direction of the pressing member along the first planar track segment is the same as the material loading direction, and the pressing member can follow the movement of the material in the material loading direction, which can reduce the relative movement between the pressing member and the material, reduce the friction force, and facilitate the action of loading the material into the container. Moreover, when the material is an electrode assembly, the risk of a separator being pulled and torn can be reduced, and the yield of battery cells can be improved.

According to some embodiments of the present application, the driving member is configured to drive the pressing member to rotate about a first axis such that the pressing plane approaches or moves away from the material, the first axis having an extension direction perpendicular to the material loading direction.

In the above solution, the pressing member is driven to rotate about the first axis by the driving member, and at the same time the pressing member moves cyclically along the closed track, so that the pressing plane approaches or moves away from the material, and the operation is simple.

According to some embodiments of the present application, the pressing unit further includes a rotating shaft and a conversion mechanism, the driving member is configured to drive the rotating shaft to rotate, the first axis is a central axis of the rotating shaft, and the conversion mechanism is configured to convert a rotational movement of the rotating shaft into a cyclical movement of the pressing member along the closed track.

In the above solution, when the driving member drives the rotating shaft to rotate, the conversion mechanism converts the rotational movement of the rotating shaft into the cyclical movement of the pressing member along the closed track, constraining the movement track of the pressing member, so that the pressing member rotates about the first axis while performing a cyclical movement along the closed track.

According to some embodiments of the present application, the conversion mechanism includes a cam; the cam is mounted to the rotating shaft, and a projection of the cam on a plane perpendicular to the rotating shaft is a Reuleaux triangle; and the pressing member is a rectangular frame fitted outside the cam, and the pressing plane is arranged on the side of the rectangular frame facing toward the material.

In the above solution, the conversion mechanism includes a cam, the projection of the cam on a plane perpendicular to the rotating shaft is a Reuleaux triangle, and the rectangular frame is fitted outside the cam, so that the structure is simple, and based on the structure of the Reuleaux triangle, the cam can drive the rectangular frame to move when the cam follows the rotation of the rotating shaft, such that the pressing plane approaches or moves away from the material.

According to some embodiments of the present application, the conversion mechanism further includes a first guide rail configured to guide the rectangular frame to move along the closed track.

In the above solution, the movement of the rectangular frame is guided by the first guide rail, and the track of the rectangular frame is constrained so that the rectangular frame moves along the closed track.

According to some embodiments of the present application, the pressing member is a pressing roller having an extension direction parallel to the extension direction of the first axis, and the pressing plane is part of an outer peripheral surface of the pressing roller.

In the above solution, the pressing member is a pressing roller with a simple structure, and the pressing plane is part of the outer peripheral surface of the pressing roller, thereby providing a better pressing effect on the material.

According to some embodiments of the present application, the pressing roller has a polygonal cross-section.

In the above solution, the polygonal cross-section facilitates the machining of the pressing roller.

According to some embodiments of the present application, the pressing roller has a rectangular cross-section.

In the above solution, the rectangular cross-section makes the structure simple, and any outer peripheral surface of the pressing roller can be used as the pressing plane.

According to some embodiments of the present application, the pressing unit includes a plurality of pressing rollers arranged at intervals around the rotating shaft and configured to revolve about the first axis.

In the above solution, a plurality of pressing rollers revolve about the first axis, so that different pressing rollers act on the material and alternately press the material, facilitating the entrance of the material into the container.

According to some embodiments of the present application, the conversion mechanism includes: a pair of holders arranged at the rotating shaft at intervals in an axial direction of the rotating shaft, the plurality of pressing rollers being movably mounted to the pair of holders; and a position-limit member fitted to the pressing rollers and configured to guide the pressing rollers to revolve about the first axis along the closed track and limit the spinning of the pressing rollers.

In the above solution, a pair of holders are arranged at the rotating shaft at intervals, a plurality of pressing rollers are movably mounted to the pair of holders so as to position and support the plurality of pressing rollers, and the pair of holders are driven to rotate by the rotating shaft, so that the plurality of pressing rollers can revolve about the first axis. By fitting the position-limit member to the pressing rollers, the pressing rollers move along the closed track and limit the spinning of the pressing rollers, the pressing plane keeps facing toward the material, and the plurality of pressing rollers can be alternately fitted to the material, facilitating the entrance of the material into the container.

According to some embodiments of the present application, each holder is provided with a first mounting hole through which the rotating shaft passes and a plurality of second mounting holes through which the pressing rollers pass, the plurality of second mounting holes being arranged corresponding to the plurality of pressing rollers and distributed at intervals in a circumferential direction of the first mounting hole.

In the above solution, the rotating shaft is mounted in the first mounting hole to facilitate the positioning of the rotating shaft; and the plurality of pressing rollers pass through the plurality of second mounting holes to facilitate the positioning of the plurality of pressing rollers.

According to some embodiments of the present application, each pressing roller is provided with fitting portions, each fitting portion is arranged in a respective second mounting hole, and the second mounting hole has a size in a radial direction of the rotating shaft that is larger than a size of the fitting portion in the radial direction of the rotating shaft.

In the above solution, the fitting portion is movably fitted to the second mounting hole, so that the fitting portion can move relative to the holder in the radial direction of the rotating shaft.

According to some embodiments of the present application, in an axial direction of the pressing roller, each fitting portion is located between a respective end of the pressing roller and the pressing plane, and the fitting portion has a cross-sectional area smaller than that of a part of the pressing roller that is adjacent to the fitting portion.

In the above solution, the cross-sectional area of the fitting portion is smaller than that of the part of the pressing roller adjacent to the fitting portion, and the fitting portion is a portion of the pressing roller that has a smaller cross-sectional area, so as to facilitate the assembly of the pressing roller and the holder.

According to some embodiments of the present application, the fitting portion has a circular cross-section.

In the above solution, the circular cross-section facilitates machining, and also makes the pressing roller rotate flexibly relative to the holder.

According to some embodiments of the present application, the holder is in the shape of a disk, and each second mounting hole extends to an edge of the holder in a radial direction of the holder.

In the above solution, the holder in the shape of a disk facilitates the machining and manufacturing thereof; and each second mounting hole extending to the edge of the holder in the radial direction of the holder facilitates the assembly of the pressing roller.

According to some embodiments of the present application, two position-limit members are provided, and two ends of the rotating shaft are respectively rotatably mounted to the two position-limit members; each position-limit member has a first surface facing toward the other position-limit member, and the first surface is provided with a position-limit groove, and the respective end of the pressing roller is configured to move along groove sides of the position-limit groove, to form the closed track.

In the above solution, the moving track of the end of the pressing roller is constrained by the position-limit groove, which has a better position-limit effect, so that the pressing roller keeps moving along the closed track.

According to some embodiments of the present application, the position-limit groove has a rectangular outer contour, and the closed track is a rectangular track.

In the above solution, the position-limit groove has a rectangular outer contour, and the closed track is a rectangular track, so that the machining is convenient and the pressing roller moves stably, and at the same time, it is also possible to limit the pressing plane to facing toward the material.

According to some embodiments of the present application, the end of the pressing roller has a rectangular cross-section.

In the above solution, the rectangular cross-section facilitates the fitting of the pressing roller with the position-limit groove, so that the pressing roller moves stably.

According to some embodiments of the present application, the first surface is further provided with an avoidance groove, the avoidance groove being arranged at a corner of the position-limit groove and in communication with the position-limit groove, and configured to avoid the pressing roller.

In the above solution, the provision of the avoidance groove can avoid the pressing roller, so that the pressing roller moves flexibly and stably.

According to some embodiments of the present application, a rolling wheel is mounted to an end surface of the pressing roller, a groove bottom surface of the position-limit groove is provided with a guide groove, and the rolling wheel is in a rolling fit with groove sides of the guide groove.

In the above solution, the rolling wheel can rotate relative to the pressing roller, the rolling wheel is in a rolling fit with the groove sides of the guide groove, and the rolling of the rolling wheel drives the pressing roller to move in the position-limit groove, so that the pressing roller moves flexibly.

According to some embodiments of the present application, in an extension direction of the first axis, a projection of the guide groove is located in the position-limit groove.

In the above solution, the projection of the guide groove is located in the position-limit groove, and the rolling wheel is in a rolling fit with the groove side of the guide grooves, which will not affect the movement of the end of the pressing roller along the groove sides of the position-limit groove, and facilitate the machining and manufacturing of the guide groove.

According to some embodiments of the present application, in the radial direction of the rotating shaft, the groove sides of the guide groove are closer to the first axis than the groove sides of the position-limit groove.

In the above solution, the groove sides of the guide groove are closer to the first axis than the groove sides of the position-limit groove, so that through the rolling fit between the rolling wheel and the groove sides of the guide groove, the pressing roller moves flexibly.

According to some embodiments of the present application, the guide groove has a rectangular outer contour.

In the above solution, the guide groove has a rectangular outer contour, so that the structure is simple, and it is easy to machine; and when the closed track is a rectangular track, the pressing roller moves flexibly.

According to some embodiments of the present application, a circular arc transition is provided between two adjacent groove sides of the guide groove.

In the above solution, the circular arc transition between two adjacent groove sides facilitates flexible and stable rolling of the rolling wheel.

According to some embodiments of the present application, the pressing unit further includes a first base, the first base including two position-limit members and being provided with a stepped surface configured to abut against an open end of the container.

In the above solution, the stepped surface can realize the positioning of the open end of the container, so that the first base is fitted to the container, facilitating the entrance of the material into the container.

According to some embodiments of the present application, the first base further includes a base body and a protective enclosure, the base body is connected to the two position-limit members, the protective enclosure is fixed to the base body, the protective enclosure is configured to enclose outer sides of the rotating shaft and the plurality of pressing rollers, the protective enclosure is provided with an opening for allowing the pressing rollers to be exposed to press the material, and the stepped surface is arranged along an edge of the opening.

In the above solution, the protective enclosure can protect the rotating shaft and the pressing rollers, and reduce the risk of impurities entering the protective enclosure and affecting the rotation of the rotating shaft and the pressing rollers.

According to some embodiments of the present application, the protective enclosure includes a first enclosure body and a second enclosure body oppositely arranged in the material loading direction, the first enclosure body and the second enclosure body are fastened to each other, and the first enclosure body is provided with the stepped surface.

In the above solution, the first enclosure body and the second enclosure body are fastened to each other, which is convenient for assembly and disassembly.

According to some embodiments of the present application, the pressing unit further includes a first pulley, a second pulley and a drive belt, the first pulley is connected to an output end of the driving member, the second pulley is connected to the rotating shaft, and the drive belt is fitted around the first pulley and the second pulley.

In the above solution, the driving member is in a driving connection with the rotating shaft via the first pulley, the second pulley and the drive belt, so that the power transfer is stable.

According to some embodiments of the present application, the pressing unit further includes a first base and a second base, the pressing member is arranged on the first base, and the first base is floatably arranged on the second base in a first direction, the first direction being perpendicular to the pressing plane.

In the above solution, the first base realizes the mounting and positioning of the pressing member, the second base is in a floating fit with the first base, and the second base realizes the support and positioning of the first base, so that the pressing member is fitted to the material.

According to some embodiments of the present application, a second guide rail is provided on the second base, the second guide rail extends in the first direction, and the first base is slidably arranged on the second guide rail.

In the above solution, the first base is in a sliding fit with the second base by means of the second guide rail, so that the first base moves stably relative to the second base.

According to some embodiments of the present application, the pressing unit further includes a position-limit block, a guide rod and an elastic member, wherein the position-limit block is arranged on the second base, and the position-limit block is provided with a through hole; the guide rod extends in the first direction and slidably passes through the through hole, and one end of the guide rod is connected to the first base; and the elastic member is fitted over the guide rod and elastically supported between the position-limit block and the first base.

In the above solution, the elastic member is elastically supported between the position-limit block and the first base, and the guide rod guides the elastic member to facilitate the fitting between the pressing member and the material; and when the pressing member is subjected to an action force in the first direction that is greater than the action force applied by the elastic member to the pressing member, the pressing member moves in a direction facing away from the material and presses the elastic member, so that the first base can float in the first direction, reducing the risk of damage to the pressing member due to excessive force.

According to some embodiments of the present application, the feeding device further includes a detection unit, which is arranged between the first base and the second base and configured to detect a force acting on the pressing member in the first direction.

In the above solution, before the first base moves relative to the second base, the action force applied by the elastic member to the first base is constant, and the detection unit can detect a reaction force applied by the material to the pressing member when the pressing member initially acts on the material, in order to grasp the action force applied by the pressing member to the material.

According to some embodiments of the present application, the driving member is arranged at the second base.

In the above solution, the second base can position and support the driving member, and at the same time, can also reduce the interference between the driving member and other components.

According to some embodiments of the present application, two pressing units are provided, which are arranged opposite each other in a first direction, the first direction being perpendicular to the pressing plane, and a clamping space for allowing the material to be clamped therein is formed between the two pressing units.

In the above solution, the two pressing units are arranged opposite each other in the first direction, and jointly clamp the material, further reducing the risk of the material being clamped and damaged.

According to some embodiments of the present application, the feeding device further includes a driving mechanism configured to drive the pressing unit to move in a direction opposite to the material loading direction.

In the above solution, the pressing unit is driven by the driving mechanism to move in the direction opposite to the material loading direction, and the pressing member is moved along the first planar track segment in the material loading direction, so that the material can be automatically loaded into the container.

According to some embodiments of the present application, the feeding device further includes a framework, wherein the pressing unit is mounted to the framework, and the driving mechanism is configured to drive the framework to move in a direction opposite to the material loading direction.

In the above solution, the framework realizes the mounting and positioning of the pressing unit, and the driving mechanism can drive the framework to move in the direction opposite to the material loading direction, facilitating the loading of the material into the container.

According to some embodiments of the present application, the material is an electrode assembly, and the container is a case.

In the above solution, the material is an electrode assembly, and the container is a case, so that the operation of loading the electrode assembly into the case is realized, and the yield of battery cells and the manufacturing efficiency are improved.

Additional aspects and advantages of the present application will be set forth in part in the following description, and in part will be apparent from the following description, or may be learned by practice of the present application.

DESCRIPTION OF DRAWINGS

In order to illustrate the technical solutions of the embodiments of the present application more clearly, the drawings to be used in the description of the embodiments of the present application will be described briefly below. Obviously, the drawings in the following description are merely some embodiments of the present application. For those of ordinary skill in the art, other drawings can also be obtained according to these drawings without any creative effort.

Figure 1:
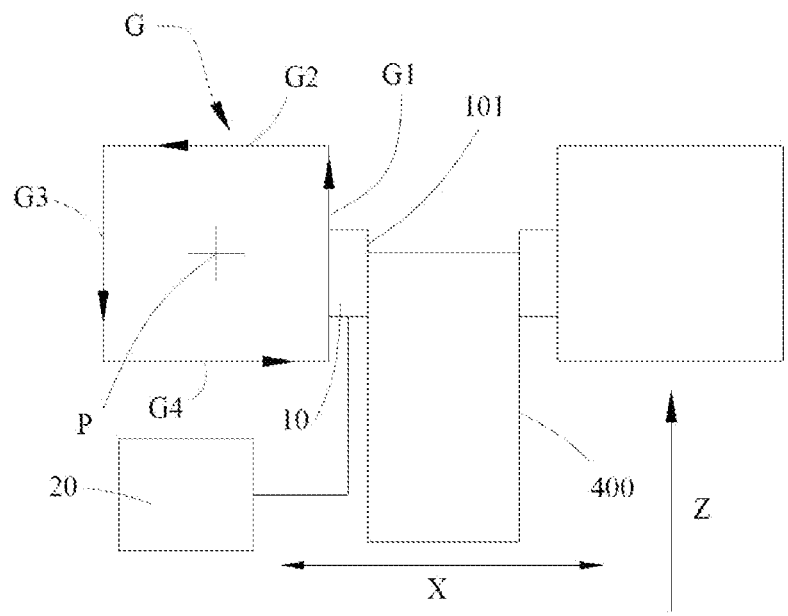
FIG. 1 is a schematic diagram of the movement of a pressing member provided in some embodiments of the present application.

In the accompanying drawings, the figures are not necessarily drawn to scale.

List of reference signs: 1000—Feeding device; 100—Pressing unit; 10—Pressing member, 10a—Rectangular frame; 10b—Pressing roller, 101—Pressing plane; 11—Pressing member body; 12—Buffer layer, 13—Fitting portion; 14—Rolling wheel; 20—Driving member; 30—Rotating shaft; 40—Conversion mechanism; 41—Cam; 42—Holder; 421—First mounting hole; 422—Second mounting hole; 43—Position-limit member; 431—First surface; 4311—Position-limit groove; 4312—Avoidance groove; 4313—Guide groove; 50—First base; 51—Base body; 52—Protective enclosure; 520—Opening; 521—First enclosure body; 522—Second enclosure body; 523—Stepped surface; 61—First pulley; 62—Second pulley; 63—Drive belt; 70—Second base; 71—Second guide rail; 81—Position-limit block; 811—Through hole; 82—Guide rod; 83—Elastic member, 90—Detection unit; 200—Driving mechanism; 300—Framework; 400—Electrode assembly, 500—Case; G—Closed track; G1—First planar track segment; G2—Second planar track segment; G3—Third planar track segment; G4—Fourth planar track segment; P—First axis; X—First direction; Y—Extension direction of the first axis; Z—Material loading direction.

DETAILED DESCRIPTION

In order to make the objectives, technical solutions and advantages of the embodiments of the present application clearer, the technical solutions in the embodiments of the present application will be clearly and completely described below with reference to the drawings for the embodiments of the present application. Apparently, the described embodiments are some of, rather than all of, the embodiments of the present application. On the basis of the embodiments of the present application, all the other embodiments obtained by those skilled in the art without any inventive effort shall fall within the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the orientation or positional relationships indicated by the technical terms "center", "axial", "radial", "circumferential" and the like are based on the orientation or positional relationships shown in the drawings, and are only for convenience and simplification of the description of the embodiments of the present application, but do not indicate or imply that the devices or elements referred to must have particular orientations, be constructed and operated in particular orientations, and therefore cannot be construed as a limitation of the embodiments of the present application.

In the description of the embodiments of the present application, unless otherwise expressly specified and limited, the technical terms "mounting," "connected," "connecting," "fixing", and the like shall be understood in a broad sense, which, for example, may be a fixed connection, or a detachable connection or an integral connection; may also be a mechanical connection, or an electrical connection; may be a direct connection, or an indirect connection through an intermediate medium, and may be a communication within two elements or an interactive relationship between two elements. For those of ordinary skill in the art, the specific meanings of the above terms in the embodiments of the present application can be understood according to specific situations.

In the present application, "a plurality of" means two or more (including two), similarly, "a plurality of groups" means two or more groups (including two groups), and "a plurality of sheets" means two or more sheets (including two sheets).

A battery mentioned in the present application refers to a single physical module that includes one or more battery cells to provide higher voltage and capacity. For example, the battery mentioned in the present application may include a battery module, a battery pack, or the like.

The battery cell includes an electrode assembly and an electrolyte solution, the electrode assembly being composed of a positive electrode sheet, a negative electrode sheet and a separator. The battery cell operates mainly relying on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, and the current collector not coated with the positive electrode active material layer is used as a positive tab. Taking a lithium-ion battery as an example, the positive electrode current collector may be of a material of aluminum, and the positive electrode active material may be lithium cobalt oxide, lithium iron phosphate, ternary lithium or lithium manganate, etc. The negative electrode sheet includes a negative electrode current collector and a negative electrode active material layer. The negative electrode active material layer is coated on a surface of the negative electrode current collector, and the current collector not coated with the negative electrode active material layer is used as a negative tab. The negative electrode current collector may be of a material of copper, and the negative electrode active material may be carbon, silicon, etc. In order to ensure that no fusing occurs when a large current passes, there are a plurality of positive tabs which are stacked together, and there are a plurality of negative tabs which are stacked together. The separator may be of a material such as polypropylene (PP) or polyethylene (PE).

The battery cell further includes a case and a cover. The case has an opening, the cover closes the opening to form a closed space, and the electrode assembly is accommodated in the case.

With the development of the battery technology, it is necessary to consider many design factors, such as energy density, discharge capacity, C-rate and other performance parameters. In addition, the yield and production efficiency of batteries should also be considered.

During the manufacturing process of the battery cell, the electrode assembly needs to be placed in the case to complete the operation of loading the electrode assembly into the case.

For an assembled product, there is often a process of loading a material into a container during manufacturing of the product. This process has a greater impact on the yield of the product. The reason is that in the product assembly process, a feeding device is usually used to load the material into the container, and the feeding device is likely to damage the material when conveying the material, resulting in a low yield of the product and thus a low production efficiency.

For example, taking a battery manufacturing process as an example, during the battery manufacturing process, the assembly process includes: loading an electrode assembly into a case; and loading a battery cell into a box. For a prismatic battery cell, the electrode assembly is usually loaded into the case by pushing the electrode assembly into the case. In order to ensure the group margin of the battery, the electrode assembly needs to be pressed before entering the case. The inventors have found that a transport wheel is usually used to press and transport the electrode assembly. However, since the transport wheel is in line contact with the electrode assembly, the contact area between the transport wheel and the electrode assembly is small, and the action force of the transport wheel acting on the electrode assembly is concentrated, so that it is likely to damage the electrode assembly, resulting in a low yield of battery cells and a low production efficiency.

In view of this, in order to solve the problem of low product yield and production efficiency caused by the operation of loading the material into the container, the inventors have conducted in-depth research and designed a technical solution, in which a pressing surface of the pressing member in contact with the material is designed as a pressing plane, there is a large contact area between the pressing plane and the material, and the action force applied by the pressing member to the material is dispersed, so that the risk of damage to the material by the pressing member can be reduced, thereby improving the product yield and production efficiency.

In a battery cell assembly process, when the material is an electrode assembly and the container is a case, the electrode assembly may have a high group margin and a relatively fluffy structure. The feeding device has a good pressing effect on the electrode assembly and is not likely to damage the electrode assembly, facilitating the operation of loading the electrode assembly into the case. The feeding device of the present application, in addition to being applied to the battery assembly process, can also be applied to the scene where other materials are loaded into the container, so as to improve the yield of products and production efficiency.

Figure 2:
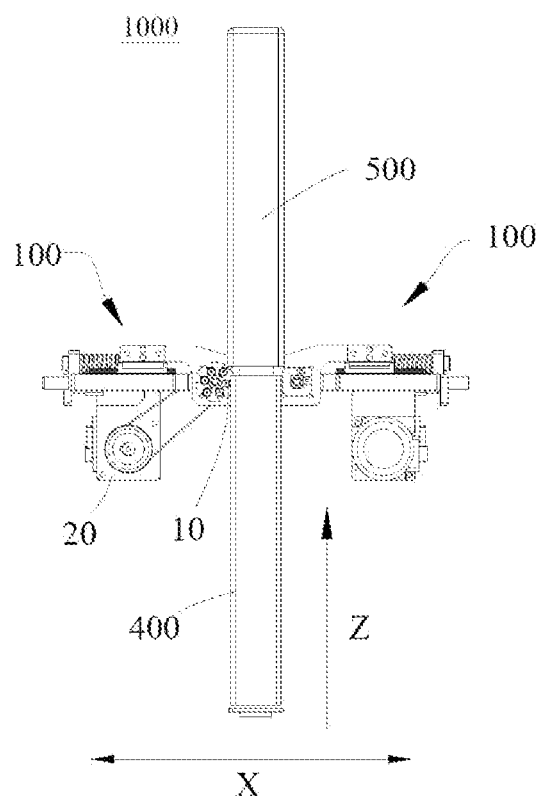
FIG. 2 is a schematic structural diagram of a feeding device provided in some embodiments of the present application.

Referring to FIGS. 1 and 2, FIG. 1 is a schematic diagram of the movement of a pressing member provided in some embodiments of the present application, and FIG. 2 is a schematic structural diagram of a feeding device provided in some embodiments of the present application. According to some embodiments of the present application, the present application provides a feeding device 1000. The feeding device 1000 is configured to load a material into a container having an opening. The feeding device 1000 includes a pressing unit 100. The pressing unit 100 includes a pressing member 10 and a driving member 20. The pressing member 10 has a pressing plane 101; and the driving member 20 is configured to drive the pressing member 10 to move cyclically along a closed track G. The closed track G includes a first planar track segment G1, and when the pressing member 10 moves along the first planar track segment G1, the pressing plane 101 forms surface contact with the material and keeps extending in a material loading direction Z. The material loading direction Z is a movement direction of the material relative to the container.

In the figures, the direction indicated by the Z direction is the material loading direction.

The pressing unit 100 is configured to be arranged with another pressing unit in a direction perpendicular to the pressing plane 101, so that a clamping space is formed between the pressing unit 100 and the other pressing unit. The clamping space is used for allowing the material to be clamped therein, the pressing unit 100 presses the material, so that the size of the material in a direction perpendicular to the pressing plane 101 is reduced, facilitating the entrance of the material into the container. It should be noted that the structure of the other pressing unit may or may not be consistent with the pressing unit 100. For example, the other pressing unit may be a transport wheel to provide pressing and support for the pressing unit 100.

The pressing member 10 is a component for contacting and pressing the material, and the pressing plane 101 is a plane of the pressing member 10 for forming surface contact with the material.

The driving member 20 is a component for providing power to drive the pressing member 10 to move cyclically along the closed track G.

The closed track G is a track with no space between ends, and the pressing member 10 can move cyclically along the closed track G. The first planar track segment G1 is an integral part of the closed track G, and an extension direction of the first planar track segment G1 is parallel to the material loading direction Z. When the pressing member 10 moves along the first planar track segment G1, a movement direction of the pressing member 10 along the first planar track segment G1 may be the material loading direction Z, or may be a direction opposite to the material loading direction Z, or may be any direction within the plane where the first planar track segment G1 is located. It should be noted that the closed track G in the figures is a rectangular track, which is only a schematic closed form, and may also have other shapes such as a triangle, a pentagon, and a combination of a circular arc and a planar segment, as long as the closed track G includes a planar segment (i.e., the first planar track segment G1), and the other parts are connected to this planar segment to form a closed track.

When the pressing member 10 moves along the first planar track segment G1, the pressing plane 101 forms surface contact with the material, the pressing plane 101 keeps extending in the material loading direction Z, and the pressing plane 101 keeps in contact with the material, facilitating the loading of the material into the case.

According to the feeding device 1000 of the embodiments of the present application, the contact between the pressing plane 101 and the material is a surface contact, so that there is a large contact area between the pressing member 10 and the material, and an action force applied by the pressing member 10 to the material is dispersed, which can reduce the risk of damage to the material by the pressing member 10, thereby improving the yield and production efficiency of products.

Figure 3:
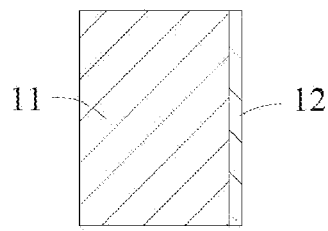
FIG. 3 is a schematic structural diagram of a pressing member provided in some embodiments of the present application.

Referring to FIG. 3, FIG. 3 is a schematic structural diagram of a pressing member provided in some embodiments of the present application. According to some embodiments of the present application, the pressing member 10 includes a pressing member body 11 and a buffer layer 12, the buffer layer 12 covers at least part of a surface of the pressing member body 11, and the pressing plane 101 is provided on the buffer layer 12.

The pressing member body 11 is an integral part of the pressing member 10 and has high strength, so as to be fitted to the material.

The buffer layer 12 is an elastic component, and the buffer layer 12 can elastically deform to absorb stress.

The buffer layer 12 may cover the entire surface of the pressing member body 11, or the buffer layer 12 may cover a part of the surface of the pressing member body 11.

The buffer layer 12 covers the surface of the pressing member body 11 in various forms. For example, the buffer layer 12 may cover the surface of the pressing member body 11 facing toward the material to form a buffer between the pressing member body 11 and the material. Alternatively, the buffer layer 12 may cover a peripheral surface of the pressing member body 11. That is, the buffer layer 12 may be arranged around the contour of the pressing member body 11 so as to have a larger contact area with the surface of the pressing member body 11.

The buffer layer 12 may be connected to the pressing member body 11 in various ways. For example, the buffer layer 12 may be a rubber layer, and the buffer layer 12 is bonded to the surface of the pressing member body 11. Alternatively, the buffer layer 12 may be an adhesive layer, and the buffer layer 12 is coated on the surface of the pressing member body 11.

In the above solution, the buffer layer 12 is provided to buffer the pressing on the material by the pressing plane 101, so as to reduce the risk of damage to the material by the pressing plane 101.

According to some embodiments of the present application, as shown in FIG. 2, the movement direction of the pressing member 10 along the first planar track segment G1 is the same as the material loading direction Z.

The movement direction of the pressing member 10 along the first planar track segment G1 is the same as the material loading direction Z, and the pressing member 10 can follow the movement of the material in the material loading direction Z, which can reduce the relative movement between the pressing member 10 and the material, reduce the friction force, and facilitate the action of loading the material into the container. Moreover, when the material is an electrode assembly, the risk of a separator being pulled and torn can be reduced, and the yield of battery cells can be improved.

Figure 4:
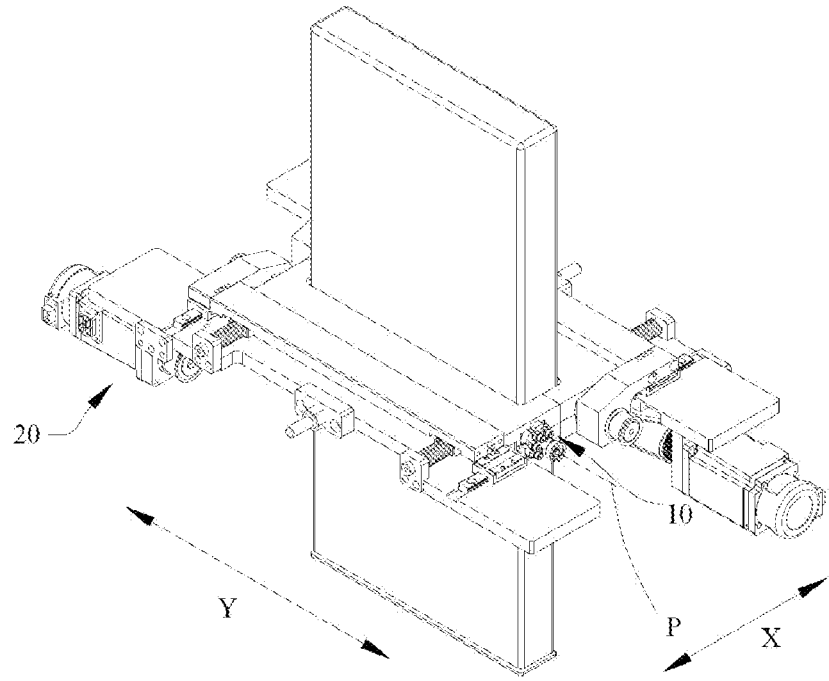
FIG. 4 is a perspective view of a feeding device provided in some embodiments of the present application.
Figure 5:
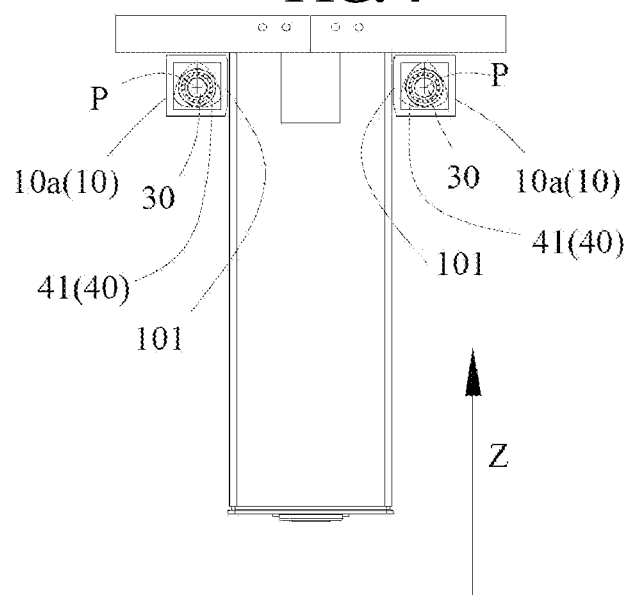
FIG. 5 is a schematic structural diagram of a conversion mechanism provided in some embodiments of the present application.
Figure 6:
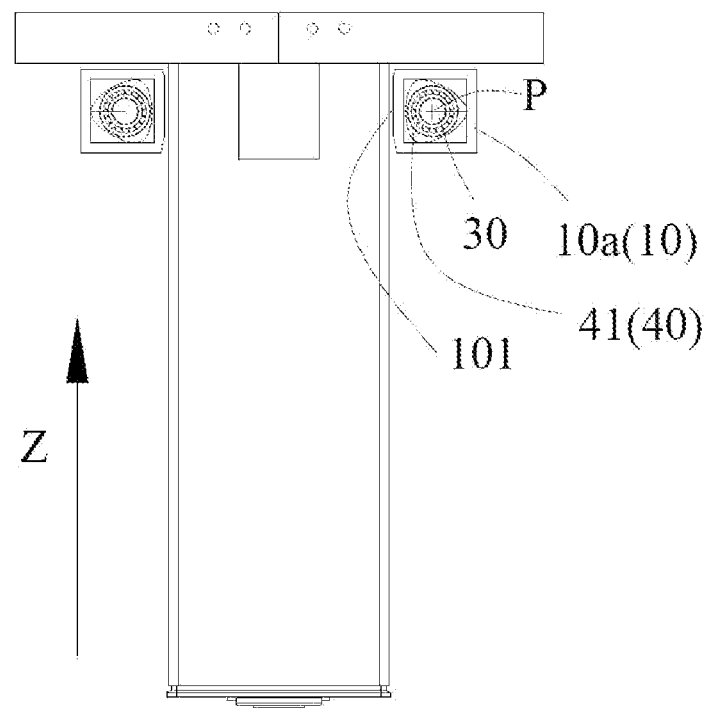
FIG. 6 is a schematic structural diagram of a conversion mechanism provided in some embodiments of the present application.
Figure 7:
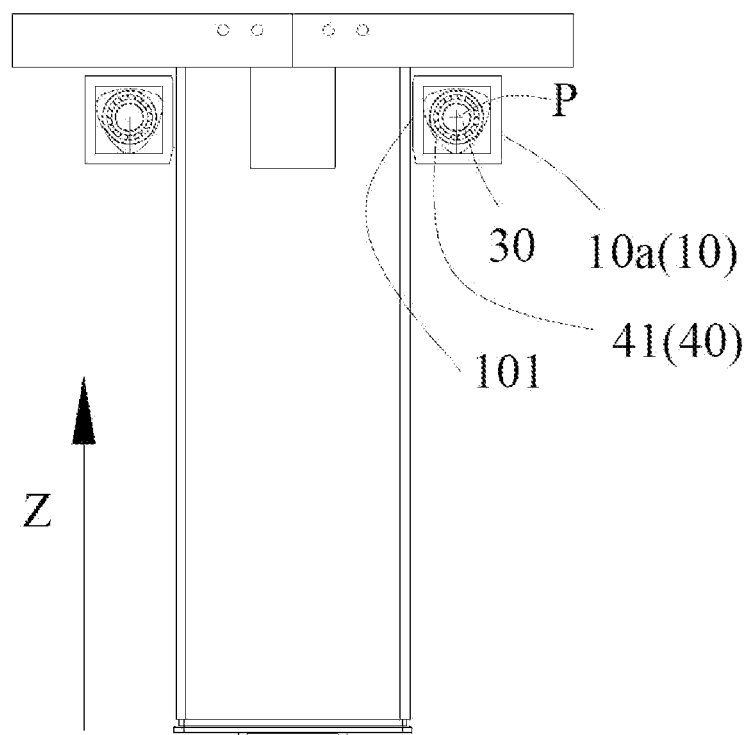
FIG. 7 is a schematic structural diagram of a conversion mechanism provided in some embodiments of the present application.
Figure 8:
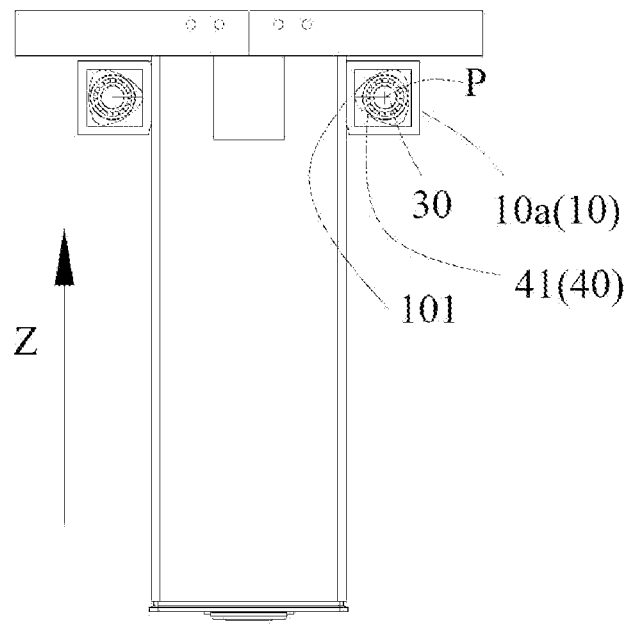
FIG. 8 is a schematic structural diagram of a conversion mechanism provided in some embodiments of the present application.

Referring to FIGS. 1 and 2, and further referring to FIG. 4, FIG. 4 is a perspective view of a feeding device provided in some embodiments of the present application. According to some embodiments of the present application, the driving member 20 is configured to drive the pressing member 10 to rotate about a first axis P such that the pressing plane 101 approaches or moves away from the material, the first axis P having an extension direction perpendicular to the material loading direction Z.

In the figures, the direction indicated by the letter Y is the extension direction of the first axis P.

The first axis P is a rotation axis of the pressing member 10, and the extension direction Y of the first axis P is perpendicular to the material loading direction Z, so that the pressing plane 101 can approach or move away from the material when following the rotation of the pressing member 10 about the first axis P.

When the driving member 20 drives the pressing member 10 to rotate about the first axis P, the pressing member 10 can move cyclically along the closed track G.

Moreover, the extension direction Y of the first axis P is perpendicular to the material loading direction Z, and the pressing plane 101 may have a large size in the extension direction Y of the first axis P, so that the pressing plane 101 has a large area.

In the above solution, the pressing member 10 is driven to rotate about the first axis P by the driving member 20, and at the same time the pressing member 10 moves cyclically along the closed track G, so that the pressing plane 101 approaches or moves away from the material, and the operation is simple.

Figure 9:
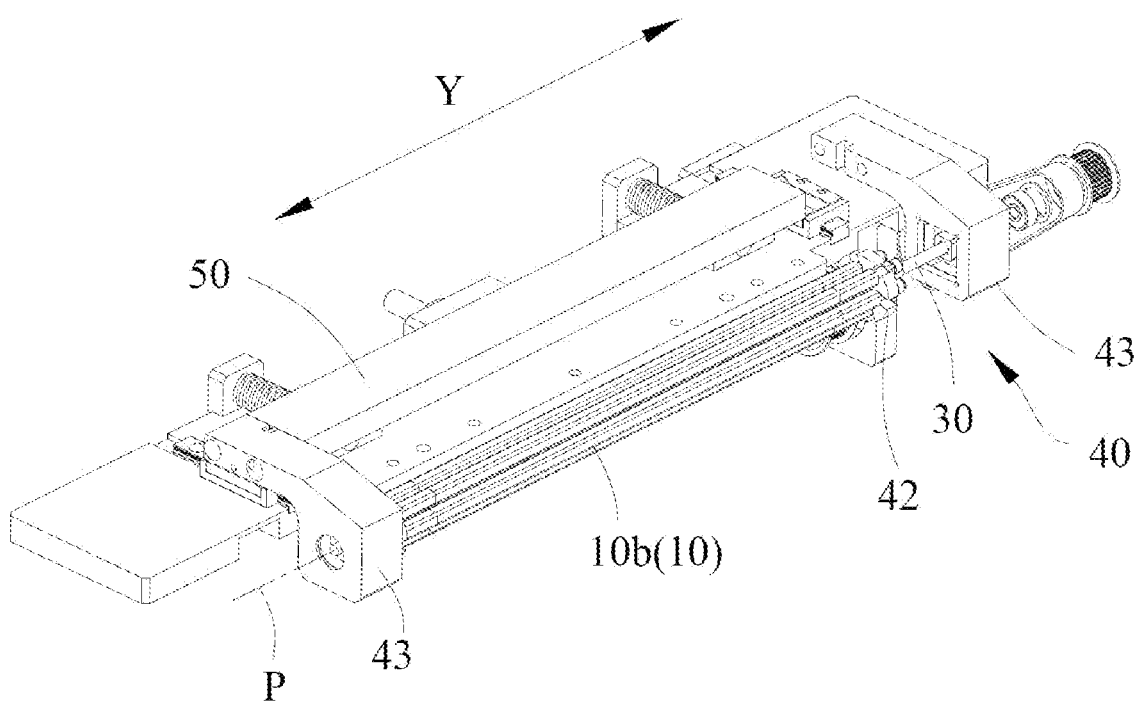
FIG. 9 is a schematic structural diagram of a conversion mechanism provided in some other embodiments of the present application.

Referring to FIGS. 5 to 9. FIGS. 5 to 8 are schematic structural diagrams of a conversion mechanism provided in some embodiments of the present application, and FIG. 9 is a schematic structural diagram of a conversion mechanism provided in some other embodiments of the present application. According to some embodiments of the present application, the pressing unit 100 further includes a rotating shaft 30 and a conversion mechanism 40, the driving member 20 is configured to drive the rotating shaft 30 to rotate, the first axis P is a central axis of the rotating shaft 30, and the conversion mechanism 40 is configured to convert a rotational movement of the rotating shaft 30 into a cyclical movement of the pressing member 10 along the closed track G (see FIG. 2).

The rotating shaft 30 can rotate about the first axis P, and the pressing member 10 can follow the rotation of the rotating shaft 30 and move along the closed track G.

The conversion mechanism 40 is a mechanism for converting the rotational movement of the rotating shaft 30, and the conversion mechanism 40 is configured to convert the rotational movement of the rotating shaft 30 into the cyclical movement of the pressing member 10 along the closed track G.

When the driving member 20 drives the rotating shaft 30 to rotate, the conversion mechanism 40 converts the rotational movement of the rotating shaft 30 into the cyclical movement of the pressing member 10 along the closed track G, constraining the movement track of the pressing member 10, so that the pressing member 10 rotates about the first axis P while performing a cyclical movement along the closed track G.

According to some embodiments of the present application, as shown in FIGS. 5 to 8, the conversion mechanism 40 includes a cam 41; the cam 41 is mounted to the rotating shaft 30, and a projection of the cam 41 on a plane perpendicular to the rotating shaft 30 is a Reuleaux triangle; and the pressing member 10 is a rectangular frame 10a. The rectangular frame 10a is fitted outside the cam 41, and the pressing plane 101 is arranged on the side of the rectangular frame 10a facing toward the material.

The cam 41 is an integral part of the conversion mechanism 40, the cam 41 is mounted to the rotating shaft 30 and can follow the rotation of the rotating shaft 30 about the first axis P.

Reuleaux triangle is also known as circular triangle.

The rectangular frame 10a is fitted outside the cam 41, and part of the end of the cam 41 (where the apex of the Reuleaux triangle is located) is in contact with an inner wall of the rectangular frame 10a. For example, two ends of the cam 41 are in contact with two adjacent inner walls of the rectangular frame 10a. FIGS. 5 to 8 show a process in which the cam 41 drives the rectangular frame 10a to move along the closed track G (see FIG. 2).

When the cam 41 follows the rotation of the rotating shaft 30, the end of the cam 41 drives the rectangular frame 10a to move along the closed track G. During the movement of the rectangular frame 10a, the pressing plane 101 faces toward the material.

In the above solution, the projection of the cam 41 on a plane perpendicular to the rotating shaft 30 is a Reuleaux triangle, and the rectangular frame 10a is fitted outside the cam 41, so that the structure is simple, and based on the structure of the Reuleaux triangle, the cam 41 can drive the rectangular frame 10a to move when the cam 41 follows the rotation of the rotating shaft 30, such that the pressing plane 101 approaches or moves away from the material.

According to some embodiments of the present application, the conversion mechanism 40 further includes a first guide rail configured to guide the rectangular frame 10a to move along the closed track G.

The first guide rail is a guide rail for guiding the movement of the rectangular frame 10a, and the rectangular frame 10a is in a sliding fit with the first guide rail.

When the cam 41 drives the rectangular frame 10a to move, the first guide rail constrains the track of the rectangular frame 10a so that the rectangular frame 10a moves along the closed track G.

According to some embodiments of the present application, as shown in FIG. 9, the pressing member 10 is a pressing roller 10b. The pressing roller 10b has an extension direction parallel to the extension direction Y of the first axis P, and the pressing plane 101 is part of an outer peripheral surface of the pressing roller 10b.

The extension direction of the pressing roller 10b is parallel to the extension direction Y of the first axis P. That is, the extension direction of the central axis of the pressing roller 10b is parallel to the extension direction Y of the first axis P.

The outer peripheral surface of the pressing roller 10b is a surface of the pressing roller 10b distributed around the central axis of the pressing roller 10b. The pressing plane 101 may be a partially planar area of the outer peripheral surface of the pressing roller 10b.

In the above solution, the pressing member 10 is a pressing roller 10b with a simple structure, and the pressing plane 101 is part of the outer peripheral surface of the pressing roller 10b, thereby providing a better pressing effect on the material.

Figure 10:
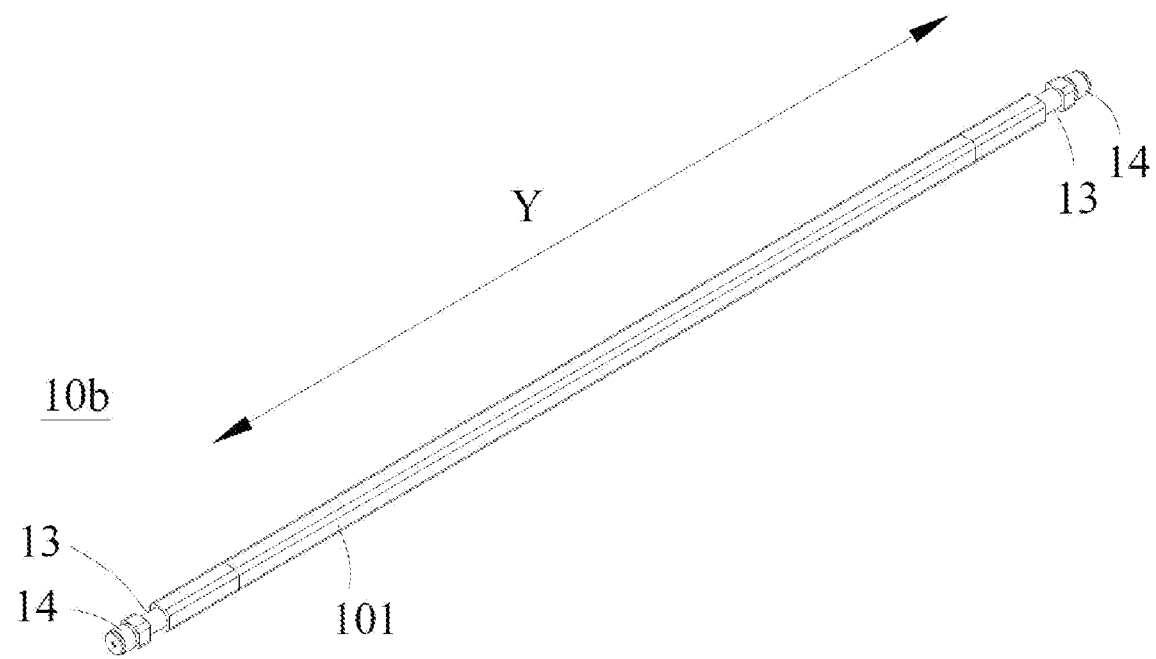
FIG. 10 is a schematic structural diagram of a pressing roller provided in some embodiments of the present application.

Referring to FIG. 10, FIG. 10 is a schematic structural diagram of a pressing roller provided in some embodiments of the present application. According to some embodiments of the present application, the pressing roller 10b has a polygonal cross-section.

The cross-section of the pressing roller 10b refers to a section of the pressing roller 10b taken along a plane perpendicular to the central axis of the pressing roller 10b. The polygonal cross-section of the pressing roller 10b means that the cross-section of the part of the pressing roller 10b acting on the material is polygonal, and the other parts may be polygonal or have other shapes.

In the above solution, the polygonal cross-section facilitates the machining of the pressing roller 10b.

According to some embodiments of the present application, the pressing roller 1b has a rectangular cross-section.

The rectangular cross-section makes the structure simple, and any outer peripheral surface of the pressing roller 10b can be used as the pressing plane 101. The rectangular cross-section of the pressing roller 10b means that the cross-section of the part of the pressing roller 10b acting on the material is rectangular, and the other parts may be rectangular or have other shapes.

According to some embodiments of the present application, as shown in FIG. 9, the pressing unit 100 includes a plurality of pressing rollers 10b. The plurality of pressing rollers 10b are arranged at intervals around the rotating shaft 30, and the plurality of pressing rollers 10b are configured to revolve about the first axis P.

The plurality of pressing rollers 10b are arranged at intervals around the rotating shaft 30, that is, the plurality of pressing rollers 10b are arranged at intervals around the first axis P, and the plurality of pressing rollers 10b can revolve about the first axis P.

In the above solution, a plurality of pressing rollers 10b revolve about the first axis P, so that different pressing rollers 10b act on the material and alternately press the material, facilitating the entrance of the material into the container.

According to some embodiments of the present application, as shown in FIGS. 9 and 10, the conversion mechanism 40 includes a pair of holders 42 and a position-limit member 43.

The pair of holders 42 are arranged at the rotating shaft 30 at intervals in an axial direction of the rotating shaft 30. The plurality of pressing rollers 10b are movably mounted to the pair of holders 42. The position-limit member 43 is fitted to the pressing rollers 10b, and the position-limit member 43 is configured to guide the pressing rollers 10b to revolve about the first axis P along the closed track G and limit the spinning of the pressing rollers 10b.

The pair of holders 42 are arranged at the rotating shaft 30 in the axial direction of the rotating shaft 30, and the pair of holders 42 are in a driving fit with the rotating shaft 30 and can follow the rotation of the rotating shaft 30 about the first axis P. For example, the holders 42 and the rotating shaft 30 are connected via keys. The pressing plane 101 may be located between the pair of holders 42, so that the pressing plane 101 is fitted to the material. The axial direction of the rotating shaft 30 is parallel to the extension direction Y of the first axis P.

The pair of holders 42 may be close to two ends of the rotating shaft 30 in the axial direction of the rotating shaft 30. Each holder 42 is close to a corresponding end of the rotating shaft 30, so that there is a larger space between the pair of holders 42.

The holder 42 is a component having a supporting function, and the plurality of pressing rollers 10b are movably mounted to the pair of holders 42. The pressing rollers 10b can move relative to the pair of holders 42. For example, the pressing rollers 10b can approach or move away from the first axis P, and when the driving member 20 drives the rotating shaft 30 to rotate, the pressing rollers 10b can move in a direction away from the first axis P.

The position-limit member 43 is a component for limiting the moving track of the pressing rollers 1b, and the position-limit member 43 can also limit the spinning of the pressing rollers 10b when the pressing rollers 10b move along the closed track G. The manner in which the position-limit member 43 is fitted to the pressing rollers 10b may be that the position-limit member 43 is fitted to the ends of the pressing rollers 1b, so as to reduce interference with the pressing plane 101.

After the pressing rollers 10b are assembled with the holders 42, in the extension direction Y of the first axis P, a part of each pressing roller 10b is located on the side of the holder 42 away from the other holder 42, and this part of the pressing roller 10b is an end of the pressing roller 10b.

In the above solution, a pair of holders 42 are arranged at the rotating shaft 30 at intervals, and a plurality of pressing rollers 10b are movably mounted to the pair of holders 42, so as to position and support the plurality of pressing rollers 10b, and the pair of holders 42 are driven to rotate by the rotating shaft 30, so that the plurality of pressing rollers 10b can revolve about the first axis P. By fitting the position-limit member 43 to the pressing rollers 10b, the pressing rollers 10b move along the closed track G and limit the spinning of the pressing rollers 10b, the pressing plane 101 keeps facing toward the material, and the plurality of pressing rollers 10b can be alternately fitted to the material, facilitating the entrance of the material into the container.

Figure 11:
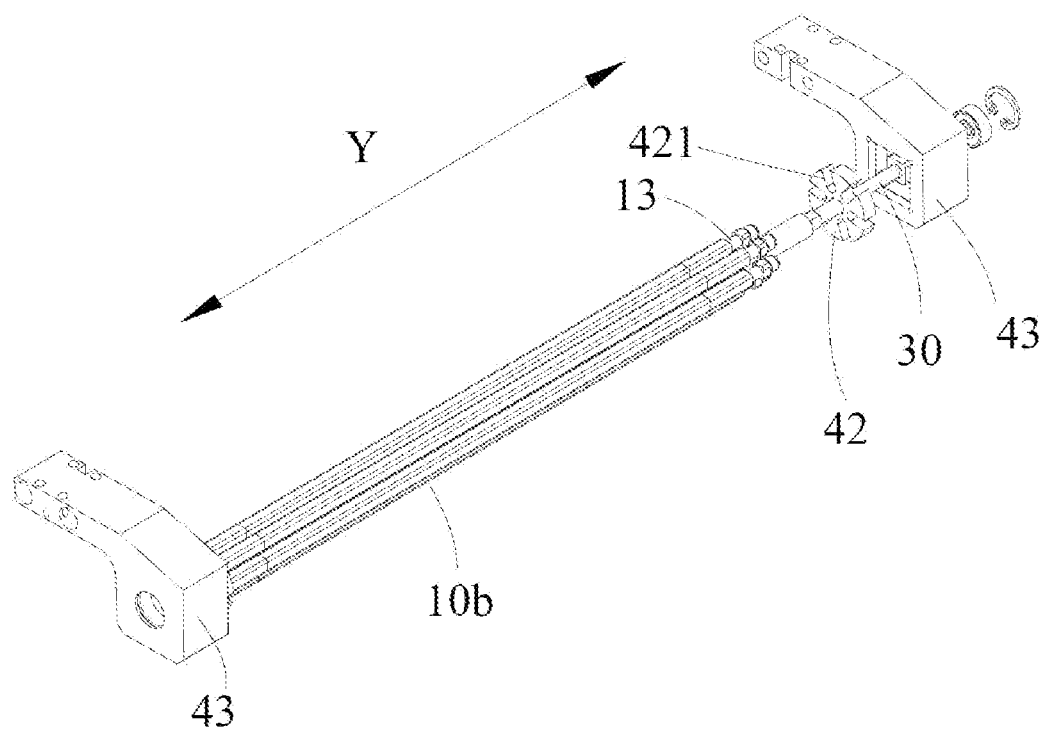
FIG. 11 is a schematic diagram of the fitting between a rotating shaft and a holder provided in some embodiments of the present application.
Figure 12:
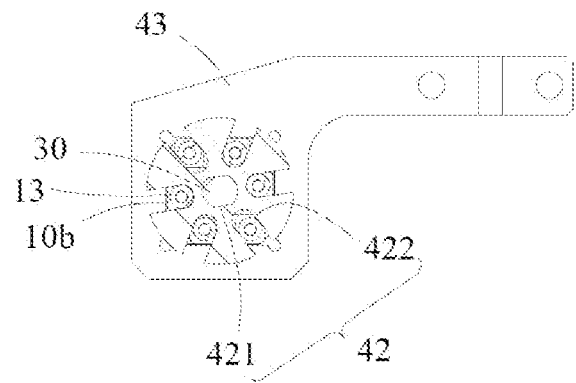
FIG. 12 is a schematic diagram of the fitting between a holder and a plurality of pressing rollers provided in some embodiments of the present application.

Referring to FIGS. 11 and 12, FIG. 11 is a schematic diagram of the fitting between a rotating shaft and a holder provided in some embodiments of the present application, and FIG. 12 is a schematic diagram of the fitting between a holder and a plurality of pressing rollers provided in some embodiments of the present application. According to some embodiments of the present application, each holder 42 is provided with a first mounting hole 421 through which the rotating shaft 30 passes and a plurality of second mounting holes 422 through which the pressing rollers 10b pass. The plurality of second mounting holes 422 are arranged corresponding to the plurality of pressing rollers 10b, and the plurality of second mounting holes 422 are distributed at intervals in a circumferential direction of the first mounting hole 421.

The first mounting hole 421 and the second mounting hole 422 may be two through holes provided in the holder 42, and the first mounting hole 421 and the second mounting hole 422 may pass through the holder 42 in the axial direction of the rotating shaft 30. The first mounting hole 421 is configured to allow the rotating shaft 30 to pass, the rotating shaft 30 passes through the first mounting hole 421, and the rotating shaft 30 can drive the holder 42 to rotate. The second mounting hole 422 is configured to allow the respective pressing roller 10b to pass, and the pressing roller 10b can move in the second mounting hole 422.

The plurality of second mounting holes 422 are arranged corresponding to the plurality of pressing rollers 10b, the number of second mounting holes 422 is the same as the number of pressing rollers 10b, and one pressing roller 10b is arranged in each mounting hole.

The plurality of second mounting holes 422 are distributed at intervals in the circumferential direction of the first mounting hole 421, that is, a central axis of the first mounting hole 421 is collinear with the central axis (i.e., the first axis P) of the rotating shaft 30, and the plurality of second mounting holes 422 are distributed at intervals around the central axis of the first mounting hole 421, so that the plurality of pressing rollers 10b are arranged at intervals around the rotating shaft 30.

In the above solution, the rotating shaft 30 is mounted in the first mounting hole 421 to facilitate the positioning of the rotating shaft 30; and the plurality of pressing rollers 10b pass through the plurality of second mounting holes 422 to facilitate the positioning of the plurality of pressing rollers 10b.

According to some embodiments of the present application, each pressing roller 1b is provided with fitting portions 13, each fitting portion 13 is arranged in a respective second mounting hole 422, and the second mounting hole 422 has a size in a radial direction of the rotating shaft 30 that is larger than a size of the fitting portion 13 in the radial direction of the rotating shaft 30.

The fitting portion 13 is a local recessed portion of the pressing roller 1b, that is, the outer peripheral surface of a local region of the pressing roller 10b is recessed toward the central axis of the pressing roller 10b to form the fitting portion 13. It can also be understood that, after a partial structure of the local region of the pressing roller 10b is hollowed out around the central axis of the pressing roller 1b, the rest of the local region is the fitting portion 13. The fitting portion 13 is located between the end of the pressing roller 1b and the pressing plane 101, and the fitting portion 13 is configured to be fitted to the holder 42.

The fitting portion 13 is provided in the second mounting hole 422, and the fitting portion 13 may be in a clearance fit with the second mounting hole 422. For example, the size of the second mounting hole 422 in the radial direction of the rotating shaft 30 is larger than that of the fitting portion 13 in the radial direction of the rotating shaft 30, such that the fitting portion 13 can approach or move away from the first axis P relative to the holder 42. When the driving member 20 drives the rotating shaft 30 to rotate, the rotating shaft 30 drives the holder 42 to rotate. Since the fitting portion 13 is in a clearance fit with the second mounting hole 422, the fitting portion 13 can move in the second mounting hole 422, and the position-limit member 43 guides the pressing roller 10b to revolve around the first axis P along the closed track G, and limits the spinning of the pressing roller 10b so that the pressing plane 101 keeps facing toward the material.

In the above solution, the fitting portion 13 is movably fitted to the second mounting hole 422, so that the fitting portion 13 can move relative to the holder 42 in the radial direction of the rotating shaft 30.

Referring to FIGS. 10 to 12, according to some embodiments of the present application, in an axial direction of the pressing roller 10b, each fitting portion 13 is located between a respective end of the pressing roller 10b and the pressing plane 101, and the fitting portion 13 has a cross-sectional area smaller than that of a part of the pressing roller 10b that is adjacent to the fitting portion 13.

The cross-sectional area of the pressing roller 10b refers to the area of the cross-section of the pressing roller 10b taken along a plane perpendicular to the central axis of the pressing roller 10b. Similarly, the cross-sectional area of the fitting portion 13 refers to the area of the cross-section of the fitting portion 13 taken along the plane perpendicular to the central axis of the pressing roller 10b. The cross-sectional area of the fitting portion 13 is smaller than the cross-sectional area of the part of the pressing roller 10b that is adjacent to the fitting portion 13, and the cross-sectional area of the fitting portion 13 may be the minimum cross-sectional area of the pressing roller 10b, or may be the minimum cross-sectional area of the local region of the pressing roller 10b.

Each fitting portion 13 is located between the respective end of the pressing roller 10b and the pressing plane 101, in other words, the pressing plane 101 is located between the two fitting portions 13. That is, the pressing plane 101 is located between the two holders 42, to prevent the holders 42 from interfering with the material.

The size of the second mounting hole 422 in the direction around the first axis P may be smaller than the size of the pressing roller 10b in the direction around the first axis P. That is, in the extension direction Y of the first axis P, the projection of the pressing roller 10b on the holder 42 partially overlaps with the second mounting hole 422, so that after the pressing roller 10b is assembled with the holder 42, the pressing roller 10b is limited from disengaging from the holder 42 in the extension direction Y of the first axis P.

In the above solution, the cross-sectional area of the fitting portion 13 is smaller than that of the part of the pressing roller 10b adjacent to the fitting portion 13, and the fitting portion 13 is a portion of the pressing roller 10b that has a smaller cross-sectional area, so as to facilitate the assembly of the pressing roller 10b and the holder 42.

According to some embodiments of the present application, the fitting portion 13 has a circular cross-section.

The circular cross-section facilitates machining, and also makes the pressing roller 10b rotate flexibly relative to the holder 42.

According to some embodiments of the present application, as shown in FIGS. 11 and 12, the holder 42 is in the shape of a disk, and each second mounting hole 422 extends to an edge of the holder 42 in a radial direction of the holder 42.

The contour of the holder 42 is roughly in the shape of a disk, and each second mounting hole 422 extends to the edge of the holder 42 in the radial direction of the holder 42, that is, the second mounting hole 422 extends from the edge of the holder 42 toward the central axis of the holder 42, and the pressing roller 10b may enter the second mounting hole 422 from the edge of the holder 42.

In the above solution, the holder 42 in the shape of a disk facilitates the machining and manufacturing thereof; and each second mounting hole 422 extending to the edge of the holder 42 in the radial direction of the holder 42 facilitates the assembly of the pressing roller 10b.

Figure 13:
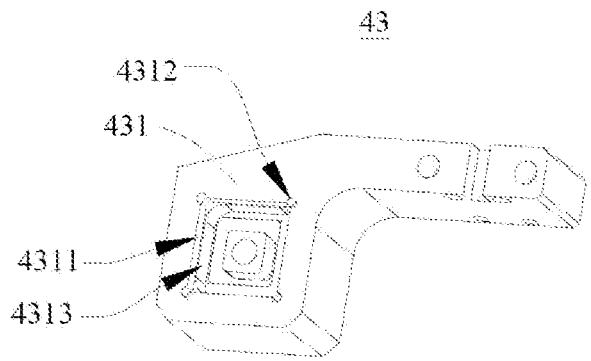
FIG. 13 is a perspective view of a position-limit member provided in some embodiments of the present application.
Figure 14:
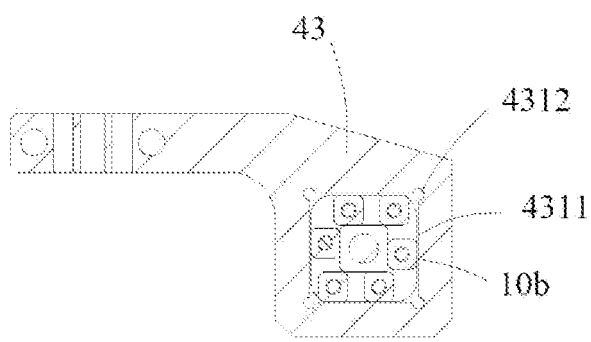
FIG. 14 is a schematic diagram of the fitting between a pressing roller and a position-limit groove provided in some embodiments of the present application.

Referring to FIG. 11, and further referring to FIGS. 13 and 14, FIG. 13 is a perspective view of a position-limit member provided in some embodiments of the present application, and FIG. 14 is a schematic diagram of the fitting between a pressing roller and a position-limit groove provided in some embodiments of the present application. According to some embodiments of the present application, two position-limit members 43 are provided, and two ends of the rotating shaft 30 are respectively rotatably mounted to the two position-limit members 43; each position-limit member 43 has a first surface 431 facing toward the other position-limit member 43; and the first surface 431 is provided with a position-limit groove 4311, and the respective end of the pressing roller 10b is configured to move along groove sides of the position-limit groove 4311, to form the closed track G.

The two ends of the rotating shaft 30 are respectively rotatably mounted to the two position-limit members 43, the rotating shaft 30 is in a rotating fit with the two position-limit members 43, and when the rotating shaft 30 drives the holder 42 to rotate, the plurality of pressing rollers 10b are fitted to the two position-limit members 43 to ensure that the pressing rollers 10b move stably along the closed track G.

The first surface 431 is the surface of the position-limit member 43 facing toward the other position-limit member 43, and the extension direction of the central axis of the rotating shaft 30 intersects the plane where the first surface 431 is located.

The position-limit groove 4311 is a groove provided on the first surface 431. It can be understood that the position-limit groove 4311 is a region formed by the first surface 431 of the position-limit member 43 being recessed away from the other position-limit member 43.

The position-limit groove 4311 is configured to be fitted to the pressing rollers 10b to limit the moving track of the pressing rollers 10b. The respective end of the pressing roller 10b extends into the position-limit groove 4311, and the peripheral surface of the end of the pressing roller 10b can come into surface contact with the groove sides of the position-limit groove 4311. When the rotating shaft 30 drives the holder 42 to rotate, the pressing roller 10b follows the rotation of the holder 42 about the first axis P, and the end of the pressing roller 10b can move along the groove sides of the position-limit groove 4311 to form the closed track G.

In the above solution, the moving track of the end of the pressing roller 10b is constrained by the position-limit groove 4311, which has a better position-limit effect, so that the pressing roller 10b keeps moving along the closed track G.

According to some embodiments of the present application, the position-limit groove 4311 has a rectangular outer contour, and the closed track G is a rectangular track.

The position-limit groove 4311 has a rectangular outer contour, and the closed track G is a rectangular track, so that the machining is convenient and the pressing roller 10b moves stably, and at the same time, it is also possible to limit the pressing plane 101 to facing toward the material.

According to some embodiments of the present application, the end of the pressing roller 10b has a rectangular cross-section.

The rectangular cross-section facilitates the matching with the outer contour of the position-limit groove 4311, so that the end of the pressing roller 10b has a large contact area with the groove sides of the position-limit groove 4311, so that the pressing roller 10b is fitted to the position-limit groove 4311, and the pressing roller 10b moves stably.

According to some embodiments of the present application, as shown in FIGS. 13 and 14, the first surface 431 is further provided with an avoidance groove 4312. The avoidance groove 4312 is arranged at a corner of the position-limit groove 4311 and in communication with the position-limit groove 4311, and the avoidance groove 4312 is configured to avoid the pressing roller 10b.

The avoidance groove 4312 is a groove provided on the first surface 431, and the avoidance groove 4312 is in communication with the position-limit groove 4311, which is convenient for machining and manufacturing.

The avoidance groove 4312 is provided at the corner of the position-limit groove 4311 to avoid the corner of the pressing roller 10b. For example, when the outer contour of the position-limit groove 4311 is rectangular, avoidance grooves 4312 may be distributed at four corners of the position-limit groove 4311.

The provision of the avoidance groove 4312 can avoid the pressing roller 10b, so that the pressing roller 10b moves flexibly and stably.

Figure 15:
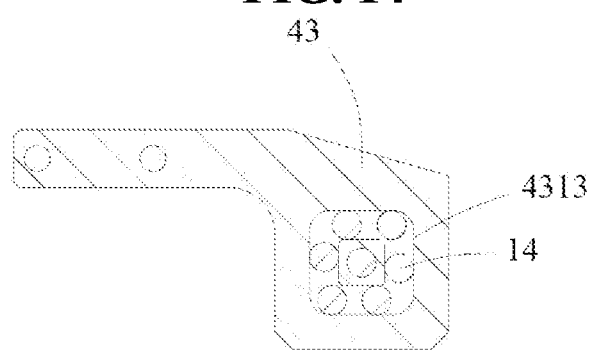
FIG. 15 is a schematic diagram of the fitting between a rolling wheel and a guide groove provided in some embodiments of the present application.

Referring to FIGS. 10 and 13, and further referring to FIG. 15, FIG. 15 is a schematic diagram of the fitting between a rolling wheel and a guide groove provided in some embodiments of the present application. According to some embodiments of the present application, a rolling wheel 14 is mounted to an end surface of the pressing roller 10b, a groove bottom surface of the position-limit groove 4311 is provided with a guide groove 4313, and the rolling wheel 14 is in a rolling fit with groove sides of the guide groove 4313.

The guide groove 4313 is a groove provided on the groove bottom surface of the position-limit groove 4311, and the guide groove 4313 has a guiding function and is configured to be fitted to the rolling wheel 14.

The rolling wheel 14 is mounted to the end surface of pressing roller 10b, the rolling wheel 14 can rotate relative to pressing roller 10b, and the rotation axis of rolling wheel 14 may be collinear with the central axis of the pressing roller 10b, such that when the pressing roller 10b moves along the groove sides of the position-limit groove 4311, the rolling wheel 14 can roll along the groove sides of the guide groove 4313. The rolling wheel 14 may be a cam follower.

In the above solution, the rolling wheel 14 can rotate relative to the pressing roller 10b, and the rolling wheel 14 is in a rolling fit with the groove sides of the guide groove 4313, and the rolling of the rolling wheel 14 drives the pressing roller 10b to move in the position-limit groove 4311, so that the pressing roller 10b moves flexibly.

Figure 16:
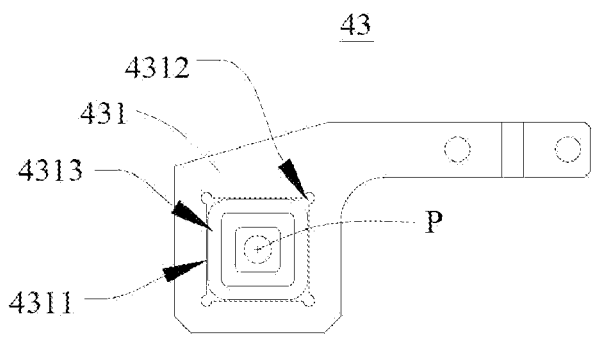
FIG. 16 is a schematic structural diagram of a position-limit member provided in some embodiments of the present application.

Referring to FIG. 16, FIG. 16 is a schematic structural diagram of a position-limit member provided in some embodiments of the present application. According to some embodiments of the present application, in the extension direction Y of the first axis P, the projection of the guide groove 4313 is located in the position-limit groove 4311.

In the above solution, the projection of the guide groove 4313 is located in the position-limit groove 4311, so that the projection of the rolling wheel 14 on the end surface of the pressing roller 10b is located in the end surface of the pressing roller 10b, and the rolling wheel 14 is in a rolling fit with the groove sides of the guide groove 4313, which will not affect the movement of the end of the pressing roller 10b along the groove sides of the position-limit groove 4311, and facilitate the machining and manufacturing of the guide groove 4313.

According to some embodiments of the present application, as shown in FIG. 16, in the radial direction of the rotating shaft 30, the groove sides of the guide groove 4313 are closer to the first axis P than the groove sides of the position-limit groove 4311.

In the above solution, the groove sides of the guide groove 4313 are closer to the first axis P than the groove sides of the position-limit groove 4311, so that in the extension direction Y of the first axis P, the projection of the guide groove 4313 may be located in the position-limit groove 4311, and through the rolling fit between the rolling wheel 14 and the groove sides of the guide groove 4313, the pressing roller 10b moves flexibly.

According to some embodiments of the present application, the guide groove 4313 has a rectangular outer contour.

In the above solution, the guide groove 4313 has a rectangular outer contour, so that the structure is simple, and it is easy to machine; and when the closed track G is a rectangular track, the guide groove 4313 has a ring-shaped outer contour, so that the pressing roller 10b moves flexibly.

According to some embodiments of the present application, as shown in FIG. 16, a circular arc transition is provided between two adjacent groove sides of the guide groove 4313.

In the above solution, the circular arc transition between two adjacent groove sides facilitates flexible and stable rolling of the rolling wheel 14.

Figure 17:
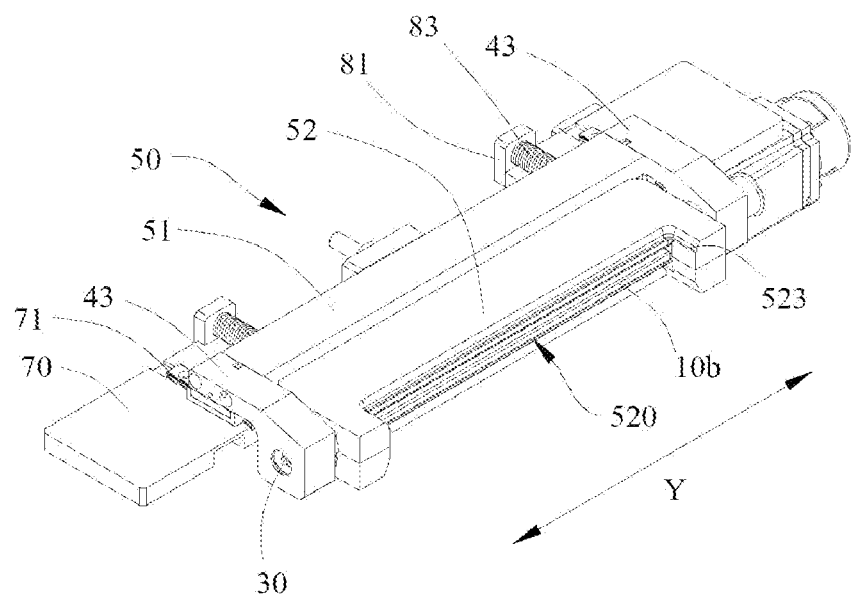
FIG. 17 is a schematic structural diagram of a first base provided in some embodiments of the present application.

Referring to FIG. 17, FIG. 17 is a schematic structural diagram of a first base provided in some embodiments of the present application. According to some embodiments of the present application, the pressing unit 100 further includes a first base 50. The first base 50 includes two position-limit members 43, and the first base 50 is provided with a stepped surface 523 configured to abut against an open end of the container.

The first base 50 is a component for positioning, and the two position-limit members 43 are two integral parts of the first base 50.

The stepped surface 523 is a surface provided on the first base 50 for abutting against the open end of the container.

In the above solution, the stepped surface 523 can realize the positioning of the open end of the container, so that the first base 50 is fitted to the container, facilitating the entrance of the material into the container.

Figure 18:
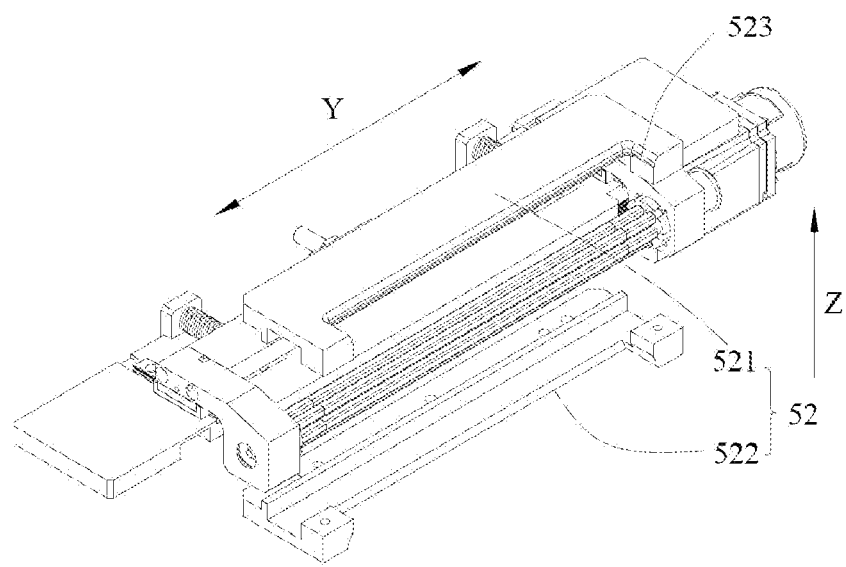
FIG. 18 is an exploded view of a first base provided in some embodiments of the present application.

Referring to FIG. 17, and further referring to FIG. 18, FIG. 18 is an exploded view of a first base provided in some embodiments of the present application. According to some embodiments of the present application, the first base 50 further includes a base body 51 and a protective enclosure 52, the base body 51 is connected to the two position-limit members 43, the protective enclosure 52 is fixed to the base body 51, the protective enclosure 52 is configured to enclose outer sides of the rotating shaft 30 and the plurality of pressing rollers 10b, the protective enclosure 52 is provided with an opening 520 for allowing the pressing rollers 10b to be exposed to press the material, and the stepped surface 523 is arranged along an edge of the opening 520.

The base body 51 has a positioning function, the two position-limit members 43 are connected to the base body 51, and the protective enclosure 52 is fixed to the base body 51.

The protective enclosure 52 may be detachably connected to the base body 51. For example, the protective enclosure 52 may be fixed to the base body via a fixing member (such as a bolt), or the protective enclosure 52 may be snap-fitted to the base body 51.

The inner space of the protective enclosure 52 can accommodate the rotating shaft 30 and the plurality of pressing rollers 10b. The opening 520 is a region provided in the protective enclosure 52 for the exposure of the pressing rollers 10b. The opening 520 is in communication with the inner space of the protective enclosure 52. The pressing planes 101 of the pressing rollers 10b can be exposed from the opening 520.

The arrangement of the stepped surface 523 along the edge of the opening 520 facilitates the fitting between the container fitted to the stepped surface 523 and the material.

In the above solution, the protective enclosure 52 can protect the rotating shaft 30 and the pressing rollers 10b, and reduce the risk of impurities entering the protective enclosure 52 and affecting the rotation of the rotating shaft 30 and the pressing rollers 10b. Moreover, the arrangement of the stepped surface 523 along the edge of the opening 520 facilitates the entrance of the material fitted to the pressing member 10 after the container is fitted to the stepped surface 523.

According to some embodiments of the present application, as shown in FIG. 18, the protective enclosure 52 includes a first enclosure body 521 and a second enclosure body 522 oppositely arranged in the material loading direction Z, the first enclosure body 521 and the second enclosure body 522 are fastened to each other, and the first enclosure body 521 is provided with the stepped surface 523.

After the first enclosure body 521 and the second enclosure body 522 are fastened together, the first enclosure body 521 may be connected to the second enclosure body 522 in a snap-fitted manner or via a locking member (such as a bolt).

The first enclosure body 521 and the second enclosure body 522 are fastened to each other, to enclose a space for accommodating the rotating shaft 30 and the plurality of pressing rollers 10b, which is convenient for assembly and disassembly. The stepped surface 523 is provided on the first enclosure body 521 to facilitate the fitting between the container and the protective enclosure 52.

Figure 19:
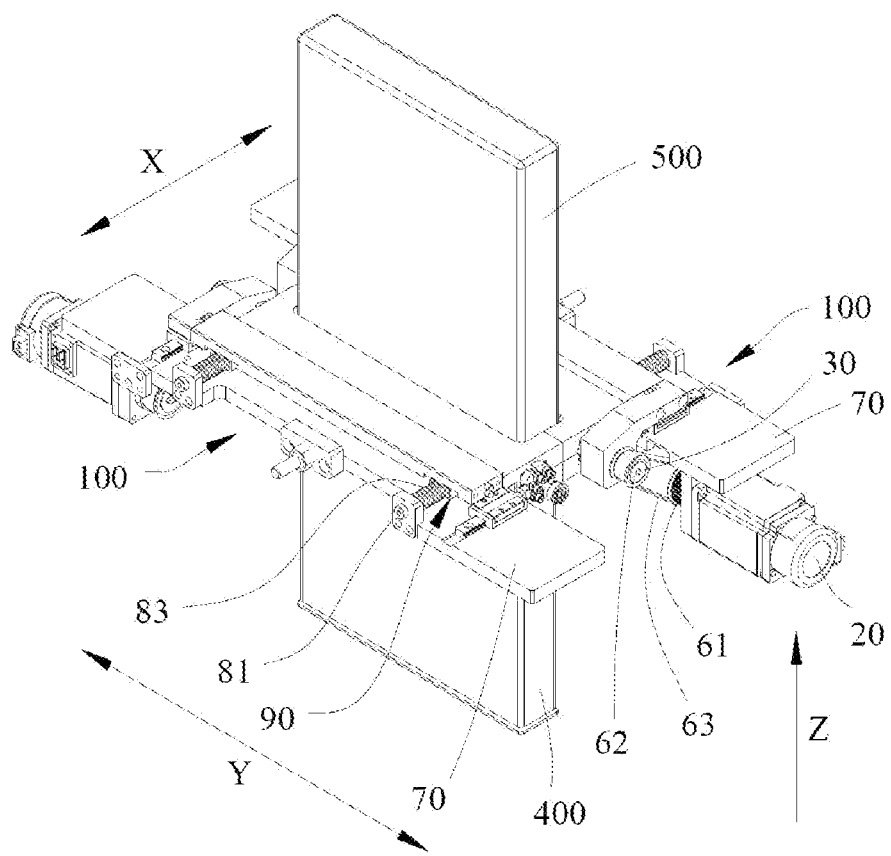
FIG. 19 is a schematic diagram of the assembly of a driving member and a rotating shaft provided in some embodiments of the present application.

Referring to FIG. 19, FIG. 19 is a schematic diagram of the assembly of a driving member and a rotating shaft provided in some embodiments of the present application. According to some embodiments of the present application, the pressing unit 100 further includes a first pulley 61, a second pulley 62 and a drive belt 63, the first pulley 61 is connected to an output end of the driving member 20, the second pulley 62 is connected to the rotating shaft 30, and the drive belt 63 is fitted around the first pulley 61 and the second pulley 62.

The first pulley 61 is connected to the output end of the driving member 20, and the driving member 20 can drive the first pulley 61 to rotate. The second pulley 62 is connected to the rotating shaft 30, and the second pulley 62 can drive the rotating shaft 30 to rotate. The drive belt 63 is fitted around the first pulley 61 and the second pulley 62, and when the first pulley 61 rotates, the drive belt 63 can transfer power to the second pulley 62 to rotate the second pulley 62.

The driving member 20 may be a servo motor, and the first pulley 61 is connected to an output end of the servo motor.

In the above solution, the driving member 20 is in a driving connection with the rotating shaft 30 via the first pulley 61, the second pulley 62 and the drive belt 63, so that the power transfer is stable.

Figure 20:
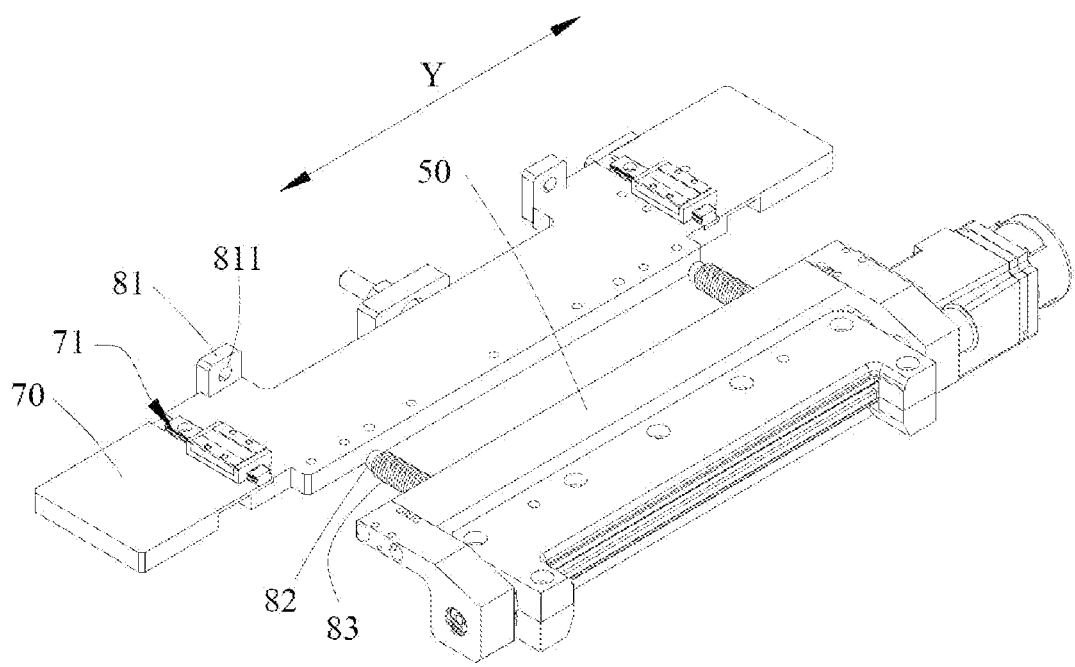
FIG. 20 is a schematic exploded view of a partial structure of a pressing unit provided in some embodiments of the present application.

Referring to FIG. 17, and further referring to FIG. 20, FIG. 20 is a schematic exploded view of a partial structure of a pressing unit provided in some embodiments of the present application. According to some embodiments of the present application, the pressing unit 100 further includes a first base 50 and a second base 70, the pressing member 10 is arranged on the first base 50, and the first base 50 is floatably arranged on the second base 70 in a first direction X. The first direction X is perpendicular to the pressing plane 101.

In the figures, the direction indicated by the letter X is the first direction, and the first base 50 can move in the first direction X relative to the second base 70.

The pressing member 10 is arranged at the first base 50, the first base 50 is in a floating fit with the second base 70, and the pressing member 10 can follow the movement of the first base 50 relative to the second base 70.

In the above solution, the first base 50 realizes the mounting and positioning of the pressing member 10, the first base 50 is in a floating fit with the second base 70, and the second base 70 realizes the support and positioning of the first base 50, so that the pressing member 10 is fitted to the material.

According to some embodiments of the present application, as shown in FIGS. 17 and 20, a second guide rail 71 is provided on the second base 70, the second guide rail 71 extends in the first direction X, and the first base 50 is slidably arranged on the second guide rail 71.

The second guide rail 71 is a guide rail provided on the second base 70, and the second guide rail 71 constrains the moving track of the first base 50 relative to the second base 70.

In the above solution, the first base 50 is in a sliding fit with the second base 70 by means of the second guide rail 71, so that the first base 50 moves stably relative to the second base 70.

In some embodiments, the position-limit member 43 is in a sliding fit with the second guide rail 71, so that the rotating shaft 30 and the plurality of pressing rollers 10b can move relative to the second base 70.

According to some embodiments of the present application, as shown in FIGS. 17 and 20, the pressing unit 100 further includes a position-limit block 81, a guide rod 82 and an elastic member 83. The position-limit block 81 is arranged on the second base 70, and the position-limit block 81 is provided with a through hole 811. The guide rod 82 extends in the first direction X, the guide rod 82 slidably passes through the through hole 811, and one end of the guide rod 82 is connected to the first base 50. The elastic member 83 is fitted over the guide rod 82 and elastically supported between the position-limit block 81 and the first base 50.

The position-limit block 81 may be detachably connected to the second base 70. For example, the position-limit block 81 may be connected to the second base 70 via a locking member (such as a bolt), or the position-limit block 81 may be snap-fitted to the second base 70; or the position-limit block 81 may be welded to the second base 70.

In the first direction X, the position-limit block 81 may be located on the side of the first base 50 away from the pressing member 10.

The through hole 811 is a hole provided in the position-limit block 81, and the through hole 811 penetrates the position-limit block 81 in the first direction X, so as to be fitted to the guide rod 82.

The guide rod 82 extends in the first direction X, that is, the extension direction of the central axis of the guide rod 82 is parallel to the first direction X. One end of the guide rod 82 may be provided with a thread, and the guide rod 82 may be threadedly connected to the first base 50.

The guide rod 82 is fitted to the through hole 811 to facilitate the movement of the first base 50 in the first direction X relative to the second base 70. The cross-section of the guide rod 82 may be in any shape, such as circle and polygon. Optionally, the cross-section of the guide rod 82 may be circular, and correspondingly, the through hole 811 may be a circular hole. The cross-section of the guide rod 82 refers to a section of the guide rod 82 taken perpendicular to the central axis of the guide rod 82.

The elastic member 83 is an elastically deformable component, and the elastic member 83 may be a spring, rubber or the like.

Two position-limit blocks 81 and two guide rods 82 are provided, and the two guide rods 82 correspond to the two position-limit blocks 81 on a one-to-one basis. In the extension direction of the rotating shaft 30 (i.e., the extension direction Y of the first axis P), the two position-limit blocks 81 are arranged at intervals.

In the above solution, the elastic member 83 is elastically supported between the position-limit block 81 and the first base 50, and the guide rod 82 guides the elastic member 83 to facilitate the fitting between the pressing member 10 and the material; and when the pressing member 10 is subjected to an action force in the first direction X that is greater than the action force applied by the elastic member 83 to the pressing member 10, the pressing member 10 moves in a direction facing away from the material and presses the elastic member 83, so that the first base 50 can float in the first direction, reducing the risk of damage to the pressing member 10 due to excessive force.

According to some embodiments of the present application, as shown in FIG. 19, the feeding device 1000 further includes a detection unit 90. The detection unit 90 is arranged between the first base 50 and the second base 70, and the detection unit 90 is configured to detect a force acting on the pressing member 10 in the first direction X.

The detection unit 90 may be a pressure sensor. The pressing member 10 is arranged on the first base 50, when the pressing member 10 is subjected to an action force in the first direction X, the action force is transferred to the first base 50, and the detection unit 90 may be arranged on the first base 50, to detect the action force to which the pressing member 10 is subjected in the first direction X.

The elastic member 83 is elastically supported on the first base 50, and the elastic member 83 applies an elastic force to the first base 50 in the first direction X. Optionally, the elastic member 83 may be elastically supported on the detection unit 90.

After the pressing member 10 comes into contact with the material, before the first base 50 moves relative to the second base 70, the action force applied by the elastic member 83 to the first base 50 is constant, and the detection unit 90 can detect a reaction force applied by the material to the pressing member 10 when the pressing member 10 initially acts on the material, in order to grasp the action force applied by the pressing member 10 to the material.

According to some embodiments of the present application, the driving member 20 is arranged on the second base 70.

In the above solution, the second base 70 can position and support the driving member 20, and at the same time, can also reduce the interference between the driving member 20 and other components.

It should be noted that, in the embodiment in which the pressing unit 100 further includes the first pulley 61, the second pulley 62 and the drive belt 63, although the first base 50 can move in the first direction X relative to the second base 70, the moving distance of the first base 50 relative to the second base 70 is relatively small (e.g., less than 2 mm), which has little influence on the fitting between the drive belt 63 and the first pulley 61 and the second pulley 62.

Referring to FIG. 19, according to some embodiments of the present application, two pressing units 100 are provided, and the two pressing units 100 are arranged opposite each other in the first direction X. The first direction X is perpendicular to the pressing plane 101. A clamping space for allowing the material to be clamped therein is formed between the pressing units 100.

The two pressing units 100 have the same structure, and the two pressing units 100 are arranged opposite each other in the first direction X to form a clamping space. The two pressing units 100 act on the material on two sides of the material in the first direction X, such that the material is pressed in the first direction X to reduce the size of the material in the first direction X, facilitating the loading of the material into the container.

In the above solution, the two pressing units 100 are arranged opposite each other in the first direction X, and jointly clamp the material, further reducing the risk of the material being clamped and damaged.

Figure 21:
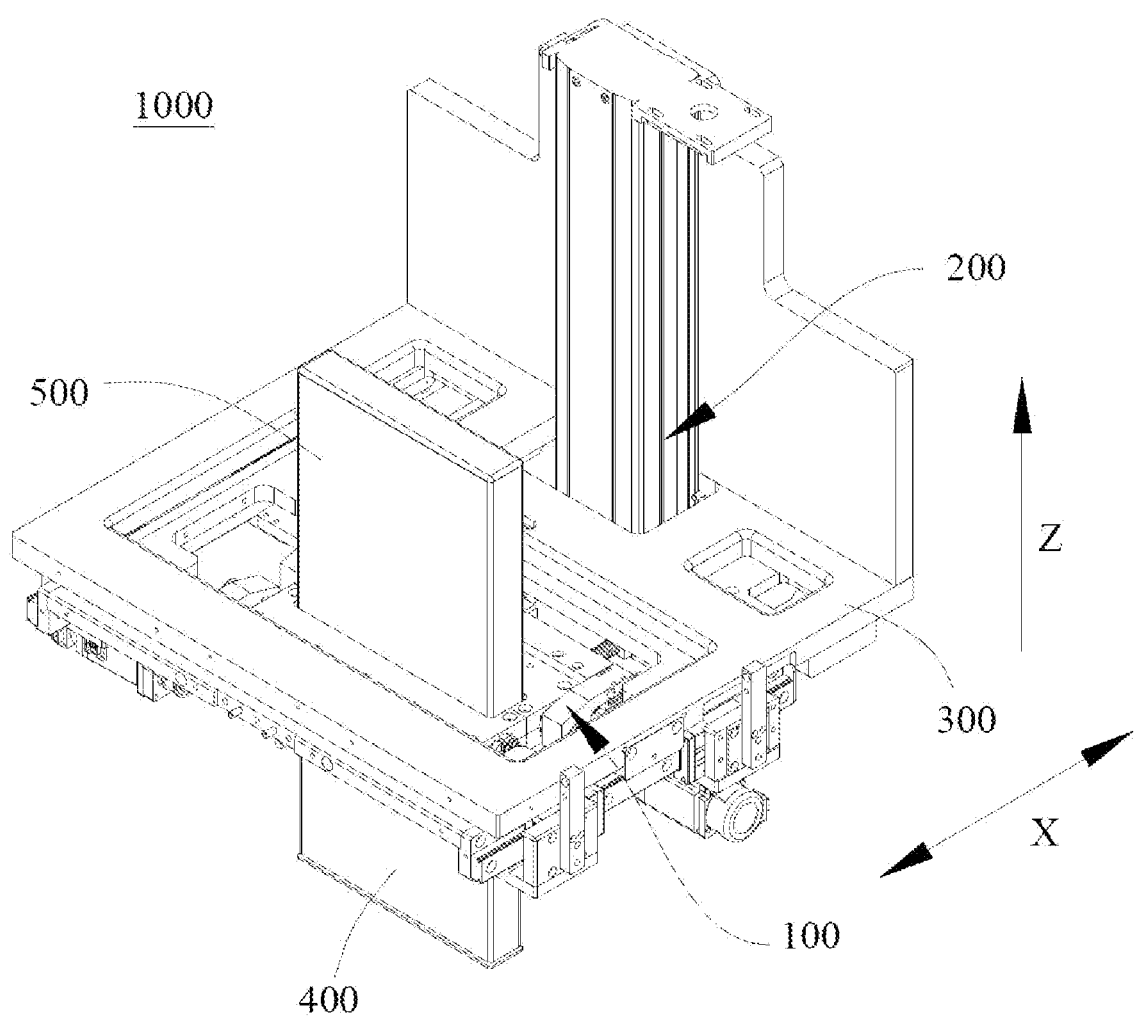
FIG. 21 is a schematic structural diagram of a feeding device provided in some other embodiments of the present application.

Referring to FIG. 21, FIG. 21 is a schematic structural diagram of a feeding device provided in some other embodiments of the present application. According to some embodiments of the present application, the feeding device 1000 further includes a driving mechanism 200. The driving mechanism 200 is configured to drive the pressing unit 100 to move in a direction opposite to the material loading direction Z.

Optionally, the driving mechanism 200 may include a driving motor and a drive assembly. The drive assembly may be a combination of a lead screw and a nut. The driving motor is connected to one end of the lead screw, and the nut is fitted over the lead screw and in a threaded fit with the lead screw. The pressing unit 100 is connected to the nut, and the driving motor drives the lead screw to rotate, such that the nut drives the pressing unit 100 to move in the direction opposite to the material loading direction Z. In some embodiments, the drive assembly may also be a belt drive assembly.

In the above solution, the pressing unit 100 is driven by the driving mechanism 200 to move in the direction opposite to the material loading direction Z, and the pressing member 10 is moved along the first planar track segment G1 in the material loading direction Z, so that the material can be automatically loaded into the container.

According to some embodiments of the present application, the feeding device 1000 further includes a framework 300. The pressing unit 100 is mounted to the framework 300, and the driving mechanism 200 is configured to drive the framework 300 to move in the direction opposite to the material loading direction Z.

In the above solution, the framework 300 realizes the mounting and positioning of the pressing unit 100, and the driving mechanism 200 can drive the framework 300 to move in the direction opposite to the material loading direction Z, facilitating the loading of the material into the container.

According to some embodiments of the present application, the material is an electrode assembly 400, and the container is a case 500.

Considering an example in which the material is the electrode assembly 400 and the container is the case 500, in the battery manufacturing process, the width of the electrode assembly 400 is generally less than that of the inner space of the case 500, facilitating the entrance of the electrode assembly 400 into the case 500. The electrode assembly 400 may have a higher group margin, and the electrode assembly 400 is relatively fluffy. Before being loaded into the case 500, the cross-sectional area of the electrode assembly 400 is larger than that of the case 500, that is, in a direction perpendicular to the pressing plane 101, the size of the electrode assembly 400 is greater than that of the inner space of the case 500. When the pressing plane 101 acts on the electrode assembly 400, the pressing member 10 presses the electrode assembly 400 to reduce the size of the electrode assembly 400 in the direction perpendicular to the pressing plane 101, facilitating the entrance of the electrode assembly 400 into the case 500.

In the above solution, the material is an electrode assembly 400, and the container is a case 500, so that the operation of loading the electrode assembly 400 into the case is realized, and the yield of battery cells and the manufacturing efficiency are improved.

According to some embodiments of the present application, referring to FIGS. 1 to 21, the present application provides a feeding device 1000 configured to load an electrode assembly 400 into a case 500 having an opening. The feeding device 1000 includes two pressing units 100, a driving mechanism 200, and a framework 300. The two pressing units 100 are arranged opposite each other in a first direction X, and a clamping space for allowing an electrode assembly 400 to be clamped therein is formed between the two pressing units 100.

Each pressing unit 100 includes a plurality of pressing members 10, a driving member 20, a rotating shaft 30, a conversion mechanism 40, a first pulley 61, a second pulley 62, a drive belt 63, a first base 50 and a second base 70.

The pressing member 10 has a pressing plane 101 for forming surface contact with the material. The pressing member 10 is a pressing roller 10b, an extension direction of the pressing roller 10b is parallel to an extension direction of the rotating shaft 30, the pressing plane 101 is part of an outer peripheral surface of the pressing roller 1b, and the pressing roller 10b has a rectangular cross-section.

The conversion mechanism 40 includes a pair of holders 42 and two position-limit members 43. The pair of holders 42 are arranged at the rotating shaft 30 at intervals in an axial direction of the rotating shaft 30. Each holder 42 is in the shape of a disk, and the holder 42 is provided with a first mounting hole 421 through which the rotating shaft 30 passes and a plurality of second mounting holes 422 through which the pressing rollers 10b pass. The plurality of second mounting holes 422 are arranged corresponding to the plurality of pressing rollers 10b on a one-to-one basis, and the plurality of second mounting holes 422 are distributed at intervals in a circumferential direction of the first mounting hole 421, so that the plurality of pressing rollers 10b are arranged at intervals around the rotating shaft 30. The pressing roller 10b has fitting portions 13. In an axial direction of the pressing roller 10b, each fitting portion 13 is located between a respective end of the pressing roller 10b and the pressing plane 101, and the fitting portion 13 has a cross-sectional area smaller than that of a part of the pressing roller 10b that is adjacent to the fitting portion 13. The fitting portion 13 is arranged in the second mounting hole 422, the fitting portion 13 is in a clearance fit with the second mounting hole 422, and the cross-sectional area of the fitting portion 13 is circular. Two ends of the rotating shaft 30 are respectively rotatably mounted to the two position-limit members 43; each position-limit member 43 has a first surface 431 facing toward the other position-limit member 43; and the first surface 431 is provided with a position-limit groove 4311, and the respective end of the pressing roller 10b is configured to move along groove sides of the position-limit groove 4311, to form a closed track G.

The position-limit groove 4311 has a rectangular outer contour, and the end of the pressing roller 10b has a rectangular cross-section. The closed track G is a rectangular track. As shown in FIG. 1, the closed track G includes a first planar track segment G1, a second planar track segments G2, a third planar track segment G3 and a fourth planar track segment G4 connected to one another in sequence. The first planar track segment G1 and the third planar track segment G3 are arranged in parallel to each other, and the second planar track segment G2 and the fourth planar track segment G4 are arranged in parallel to each other. The pressing roller 10b moves along the first planar track segment G1 in a direction the same as the material loading direction Z, the pressing roller 10b moves along the second planar track segment G2 in a direction away from the electrode assembly 400, the pressing roller 10b along the third planar track segment G3 in a direction opposite to the material loading direction Z, and the pressing roller 10b moves along the fourth planar track segment G4 in the direction of the electrode assembly 400.

The first surface 431 is further provided with an avoidance groove 4312. The avoidance groove 4312 is arranged at a corner of the position-limit groove 4311 and in communication with the position-limit groove 4311, and the avoidance groove 4312 is configured to avoid the pressing roller 10b. A rolling wheel 14 is mounted to an end surface of the pressing roller 10b, a groove bottom surface of the position-limit groove 4311 is provided with a guide groove 4313, and the rolling wheel 14 is in a rolling fit with groove sides of the guide groove 4313. A central axis of the rotating shaft 30 is the first axis P. In an extension direction Y of the first axis P, a projection of the guide groove 4313 is located in the position-limit groove 4311. In a radial direction of the rotating shaft 30, the groove sides of the guide groove 4313 are closer to the first axis P than the groove sides of the position-limit groove 4311. The guide groove 4313 has a rectangular outer contour, and a circular arc transition is provided between two adjacent groove sides of the guide groove 4313.

The driving member 20 is a servo motor, the first pulley 61 is connected to an output end of the driving member 20, the second pulley 62 is connected to the rotating shaft 30, and the drive belt 63 is fitted around the first pulley 61 and the second pulley 62. The driving member 20 is configured to drive the rotating shaft 30 to rotate, and the position-limit member 43 is configured to guide the pressing roller 10b to revolve about the first axis P along the closed track G and limit the spinning of the pressing roller 10b.

The first base 50 includes two position-limit members 43, a base body 51 and a protective enclosure 52. The base body 51 is connected to the two position-limit members 43, the protective enclosure 52 is fixed to the base body 51, the protective enclosure 52 is configured to enclose outer sides of the rotating shaft 30 and the plurality of pressing rollers 10b, the protective enclosure 52 is provided with an opening 520 for allowing the pressing rollers 10b to be exposed to press the material, a stepped surface 523 is provided along an edge of the opening 520, and the stepped surface 523 is configured to abut against an open end of the case 500.

A second guide rail 71 is provided on the second base 70, the second guide rail 71 extends in the first direction X, and the first base 50 is slidably arranged on the second guide rail 71.

The second base 70 is arranged at the framework 300, and the driving mechanism 200 is configured to drive the framework 300 to move in the direction opposite to the material loading direction Z. When the driving mechanism 200 drives the framework 300 to move in the direction opposite to the material loading direction Z, the case 500 follows the movement of the first base 50 in the direction opposite to the material loading direction Z, the driving member 20 drives the rotating shaft 30 to rotate, the pressing roller 10b moves along the first planar track segment G1 after the pressing roller 10b comes into contact with the electrode assembly 400, and the pressing rollers 10b of the two pressing units 100 clamp the electrode assembly 400 and drive the electrode assembly 400 to enter the case 500.

According to the feeding device 1000 of the embodiments of the present application, the pressing roller 10b forms surface contact with the electrode assembly 400, so that there is a large contact area between the pressing roller 10b and the electrode assembly 400, and an action force applied by the pressing roller 10b to the material is dispersed, which can reduce the risk of damage to the electrode assembly 400, thereby improving the yield and production efficiency of battery cells.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A feeding device for loading a material into a container having an opening, the feeding device comprising a pressor, the pressor comprising:
   a pressing structure having a pressing plane;
   a driver to drive the pressing structure to move cyclically along a closed track, wherein the closed track comprises a first planar track segment, and when the pressing structure moves along the first planar track segment, the pressing plane forms surface contact with the material and keeps extending in a material loading direction, the material loading direction being a movement direction of the material relative to the container;

a first base and a second base, wherein the pressing structure is arranged on the first base, and the first base is floatably arranged on the second base in a first direction, the first direction being perpendicular to the pressing plane; and a detector, which is arranged between the first base and the second base to detect a force acting on the pressing structure in the first direction.

2. The feeding device according to claim 1, wherein the pressing structure comprises a pressing structure body and a buffer layer, the buffer layer covers at least part of a surface of the pressing structure body, and the pressing plane is provided on the buffer layer.

3. The feeding device according to claim 1, wherein a movement direction of the pressing structure along the first planar track segment is the same as the material loading direction.

4. The feeding device according to claim 1, wherein the driver is configured to drive the pressing structure to rotate about a first axis such that the pressing plane approaches or moves away from the material, the first axis having an extension direction perpendicular to the material loading direction.

5. The feeding device according to claim 4, wherein the pressor further comprises a rotating shaft and a conversion structure, the driver is configured to drive the rotating shaft to rotate, the first axis is a central axis of the rotating shaft, and the conversion structure is configured to convert a rotational movement of the rotating shaft into a cyclical movement of the pressing structure member along the closed track.

6. The feeding device according to claim 5, wherein the conversion structure comprises a cam; the cam is mounted to the rotating shaft, and a projection of the cam on a plane perpendicular to the rotating shaft is a Reuleaux triangle; and the pressing structure is a rectangular frame fitted outside the cam, and the pressing plane is arranged on the side of the rectangular frame facing toward the material.

7. The feeding device according to claim 6, wherein the conversion structure further comprises a first guide rail to guide the rectangular frame to move along the closed track.

8. The feeding device according to claim 5, wherein the pressing structure is a pressing roller having an extension direction parallel to the extension direction of the first axis, and the pressing plane is part of an outer peripheral surface of the pressing roller.

9. The feeding device according to claim 8, wherein the pressing roller has a polygonal cross-section.

10. The feeding device according to claim 9, wherein the pressing roller has a rectangular cross-section.

11. The feeding device according to claim 8, wherein the pressor comprises a plurality of pressing rollers arranged at intervals around the rotating shaft and configured to revolve about the first axis.

12. The feeding device according to claim 5, wherein the pressor further comprises a first pulley, a second pulley and a drive belt, the first pulley is connected to an output end of the driver, the second pulley is connected to the rotating shaft, and the drive belt is fitted around the first pulley and the second pulley.

13. The feeding device according to claim 1 wherein a second guide rail is provided on the second base, the second guide rail extends in the first direction, and the first base is slidably arranged on the second guide rail.

14. The feeding device according to claim 13, wherein the pressor further comprises a position-limit block, a guide rod and an elastic structure, wherein the position-limit block is arranged on the second base, and the position-limit block is provided with a through hole; the guide rod extends in the first direction and slidably passes through the through hole, and one end of the guide rod is connected to the first base; and the elastic structure is fitted over the guide rod and elastically supported between the position-limit block and the first base.

15. The feeding device according to claim 1 wherein the driver is arranged at the second base.

16. The feeding device according to claim 1, wherein two pressors are provided, which are arranged opposite each other in a first direction, the first direction being perpendicular to the pressing plane, and a clamping space for allowing the material to be clamped therein is formed between the two pressor.

17. The feeding device according to claim 1, further comprising a driving structure to drive the pressor to move in a direction opposite to the material loading direction.

18. The feeding device according to claim 17, further comprising a framework, wherein the pressor is mounted to the framework, and the driving structure is configured to drive the framework to move in a direction opposite to the material loading direction.

* * * * *